US011962435B2

(12) United States Patent
Kons et al.

(10) Patent No.: US 11,962,435 B2
(45) Date of Patent: *Apr. 16, 2024

(54) RECIPROCAL CALIBRATION FOR CHANNEL ESTIMATION BASED ON SECOND-ORDER STATISTICS

(71) Applicant: Cohere Technologies, Inc., Santa Clara, CA (US)

(72) Inventors: Shachar Kons, Santa Clara, CA (US); Ronny Hadani, Santa Clara, CA (US); Paul Harris, Santa Clara, CA (US)

(73) Assignee: Cohere Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,590

(22) Filed: May 9, 2022

(65) Prior Publication Data

US 2022/0263686 A1 Aug. 18, 2022

Related U.S. Application Data

(63) Continuation of application No. 17/251,765, filed as application No. PCT/US2019/037095 on Jun. 13, 2019, now Pat. No. 11,329,848.
(Continued)

(51) Int. Cl.
*H04L 25/02* (2006.01)
*H04B 7/0413* (2017.01)
*H04L 5/00* (2006.01)

(52) U.S. Cl.
CPC ....... *H04L 25/0204* (2013.01); *H04B 7/0413* (2013.01); *H04L 5/0048* (2013.01); *H04L 25/0224* (2013.01); *H04L 25/0248* (2013.01)

(58) Field of Classification Search
None
See application file for complete search history.

(56) References Cited

U.S. PATENT DOCUMENTS 4,754,493 A 6/1988 Coates
5,083,135 A 1/1992 Nagy et al.
(Continued)

FOREIGN PATENT DOCUMENTS

WO 2011150315 12/2011
WO 2013148546 10/2013
(Continued)

OTHER PUBLICATIONS

Banelli, P. et al., "Modulation Formats and Waveforms for 5G Networks: Who Will Be the Heir of OFDM?," IEEE Signal Processing Magazine, vol. 81, pp. 80-93, Nov. 2014.
(Continued)

*Primary Examiner* — Hassan A Phillips
*Assistant Examiner* — Gautam Sharma
(74) *Attorney, Agent, or Firm* — Perkins Coie LLP

(57) ABSTRACT

A wireless communication method includes receiving, by a first wireless device during a training phase, reference tones using a first number of resource elements from a transmitter of a second wireless device, wherein the first wireless device comprises multiple receiving antennas, estimating, by the first wireless device, from the receiving the reference tones, a second order statistics of wireless channels between the multiple receiving antennas and the transmitter of the second wireless device, and performing channel estimation, during an operational phase subsequent to the training phase, using the second order statistics and reference tones received on a second number of resource elements, wherein the second number is less than the first number.

20 Claims, 22 Drawing Sheets

Related U.S. Application Data

(60) Provisional application No. 62/726,822, filed on Sep. 4, 2018, provisional application No. 62/684,594, filed on Jun. 13, 2018.

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,327,812 B2 | 2/2008 | Auer |
| 7,392,018 B1 | 6/2008 | Ebert et al. |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,722,741 B1 | 8/2017 | Rakib et al. |
| 9,729,281 B2 | 8/2017 | Hadani et al. |
| 10,667,148 B1 | 5/2020 | Hadani et al. |
| 10,681,568 B1 | 6/2020 | Hadani et al. |
| 10,693,581 B2 | 6/2020 | Rakib et al. |
| 10,693,692 B2 | 6/2020 | Hadani et al. |
| 10,716,095 B2 | 7/2020 | Rakib et al. |
| 10,749,651 B2 | 8/2020 | Hebron et al. |
| 10,826,728 B2 | 11/2020 | Tsatsanis et al. |
| 10,855,425 B2 | 12/2020 | Kons et al. |
| 10,873,418 B2 | 12/2020 | Kons et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2006/0189280 A1* | 8/2006 | Goldberg ............... H04W 52/42 455/562.1 |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0177695 A1* | 8/2007 | Salem ................... H04B 1/7105 375/E1.025 |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0002816 A1* | 1/2010 | Mody ................... H04L 27/0012 375/350 |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0017884 A1 | 7/2010 | Nassiri-Toussi et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0195670 A1 | 8/2011 | Dakshinamurthy et al. |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0003802 A1* | 1/2013 | Doron ................... H04L 25/0248 375/224 |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |

(56) References Cited

U.S. PATENT DOCUMENTS

| | | |
|---|---|---|
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0304130 A1* | 10/2015 | Logothetis ............... H04L 1/203 455/115.2 |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0272177 A1* | 9/2017 | Seyama ................. H04B 15/00 |
| 2017/0288913 A1 | 10/2017 | Rakib et al. |
| 2017/0289961 A1 | 10/2017 | Rakib et al. |
| 2017/0302353 A1* | 10/2017 | Rahman .............. H04B 7/0486 |
| 2018/0076871 A1* | 3/2018 | Rahman .............. H04B 7/0626 |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0227159 A1 | 8/2018 | Rakib et al. |
| 2018/0242170 A1 | 8/2018 | Hadani et al. |
| 2018/0262306 A1 | 9/2018 | Hadani et al. |
| 2018/0288809 A1 | 10/2018 | Delfeld et al. |
| 2018/0302802 A1 | 10/2018 | Fanfelle |
| 2019/0013914 A1* | 1/2019 | Xu ........................ H04L 5/0082 |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0081836 A1 | 3/2019 | Hadani et al. |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186397 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0126750 A1 | 4/2021 | Kons et al. |
| 2021/0135905 A1 | 5/2021 | Kons et al. |
| 2021/0194732 A1 | 6/2021 | Kons et al. |

FOREIGN PATENT DOCUMENTS

| | | |
|---|---|---|
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 | 1/2017 |
| WO | 2017011478 | 1/2017 |
| WO | 2017044501 | 3/2017 |
| WO | 2017087706 | 5/2017 |
| WO | 2017100666 | 6/2017 |
| WO | 2017147439 | 8/2017 |
| WO | 2017165697 | 9/2017 |
| WO | 2017173160 | 10/2017 |
| WO | 2017173389 | 10/2017 |
| WO | 2017201467 | 11/2017 |
| WO | 2018031367 | 2/2018 |
| WO | 2018031938 | 2/2018 |
| WO | 2018031952 | 2/2018 |
| WO | 2018032016 | 2/2018 |
| WO | 2018064327 | 4/2018 |
| WO | 2018064587 | 4/2018 |
| WO | 2018064605 | 4/2018 |
| WO | 2018086696 | 5/2018 |
| WO | 2018106731 | 6/2018 |
| WO | 2018129554 | 7/2018 |
| WO | 2018140837 | 8/2018 |
| WO | 2018191309 | 10/2018 |
| WO | 2018195548 | 10/2018 |
| WO | 2018200567 | 11/2018 |
| WO | 2018200577 | 11/2018 |
| WO | 2019014332 | 1/2019 |
| WO | 2019032142 | 2/2019 |
| WO | 2019032605 | 2/2019 |
| WO | 2019036492 | 2/2019 |
| WO | 2019051093 | 3/2019 |
| WO | 2019051427 | 3/2019 |
| WO | 2019055861 | 3/2019 |
| WO | 2019068053 | 4/2019 |
| WO | 2019060596 | 5/2019 |
| WO | 2019089986 | 5/2019 |
| WO | 2019113046 | 6/2019 |
| WO | 2019157230 | 8/2019 |

(56) References Cited

FOREIGN PATENT DOCUMENTS

| WO | 2019173775 | 9/2019 |
|---|---|---|
| WO | 2019241436 | 12/2019 |
| WO | 2019241589 | 12/2019 |
| WO | 2020142520 | 7/2020 |
| WO | 2020206304 | 10/2020 |
| WO | 2020227619 | 11/2020 |
| WO | 2020247768 | 12/2020 |
| WO | 2021026212 | 2/2021 |
| WO | 2021062354 | 4/2021 |

OTHER PUBLICATIONS

El Hattachi, R. et al., "Ngmn 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.

Catt, "UL ACK/NACK transmission methods for LTE-A," 3GPP TSG RAN WG1 Meeting #60bis, R1-102453, Beijing, China, Apr. 12-16, 2010, 8 pages.

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.

Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).

Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.

Extended European Search Report dated Jun. 25, 2021 for EP Application No. 19819211.4, 10 pages.

International Search Report and Written Opinion for PCT/US19/037095, dated Sep. 2, 2019, 13 pages.

Communication Pursuant to Article 94 dated May 10, 2022 for EP Application No. 19819211.4, 5 pages.

\* cited by examiner

RECIPROCAL CALIBRATION FOR CHANNEL ESTIMATION BASED ON SECOND-ORDER STATISTICS

CROSS-REFERENCE TO RELATED APPLICATION(S)

This patent document is a continuation of U.S. patent application Ser. No. 17/251,765, filed Dec. 11, 2020 which is a 371 of International Application No. PCT/US2019/037095, filed Jun. 13, 2019, which claims priority to and benefits of U.S. Provisional Application No. 62/684,594 entitled "SECOND ORDER STATISTICS FOR EFFICIENT CHANNEL ESTIMATION," filed on Jun. 13, 2018 and U.S. Provisional Application No. 62/726,822 entitled "RECIPROCITY CALIBRATION IN WIRELESS COMMUNICATIONS," filed on Sep. 4, 2018. The entire contents of the aforementioned patent applications are incorporated by reference as part of the disclosure of this patent document.

TECHNICAL FIELD

The present document relates to wireless communication, and more particularly, precoding of wireless signals for transmission.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

This document discloses techniques for channel estimation. In one example, a reciprocal calibration technique is used. In another example, a minimal set of resource elements and an estimate of second order statistics of the channel are used.

In an example aspect, a wireless communication method is disclosed. The method includes receiving, by a first wireless device during a training phase, reference tones using a first number of resource elements from a transmitter of a second wireless device, wherein the first wireless device comprises multiple receiving antennas; estimating, by the first wireless device, from the receiving the reference tones, a second order statistics of wireless channels between the multiple receiving antennas and the transmitter of the second wireless device; and performing channel estimation, during an operational phase subsequent to the training phase, using the second order statistics and reference tones received on a second number of resource elements, wherein the second number is less than the first number.

In another example aspect, a method of wireless communication is disclosed. The method includes transmitting, to multiple receive antennas of a first wireless device from a transmit antenna of a second wireless device, during a training phase, reference tones using a first number of resource elements of a wireless channel between the transmit antenna and the multiple receive antennas; receiving, at an end of the training phase, an instruction to transmit reference tones using a second number of resource elements; and transmitting, during an operational phase after the training phase, reference tones to the multiple receive antennas of the first wireless device using the second number of resource elements, wherein the second number is different from the first number and wherein the second number is based on an estimated second order statistics of the wireless channel.

In yet another example aspect, a method of wireless communication is disclosed. The method includes estimating, during a training phase, a second order statistics for a first wireless channel and a second wireless channel between a transmitter and a receiver comprising multiple antennas, wherein the second order statistics is estimated using reference tones transmitted on a first number of resource elements; predicting, during an operational phase subsequent to the training phase, an estimate of the second wireless channel based on the second order statistics and an estimate of the first wireless channel calculated using reference tones transmitted on a second number of resource elements, where the second number is less than the first number; and communicating, during the operational phase, over the second wireless channel using the estimate of the second wireless channel resulting from the predicting; wherein the first wireless channel and the second wireless channel include non-overlapping frequencies.

In yet another example aspect, a method of wireless communication is disclosed. The method includes receiving, by a first communication device, a number of subcarriers from a second communication device, each including a corresponding reference signal; calculating an inversion factor for each subcarrier based on a received value of the corresponding reference signal; and transmitting by the first communication device to the second communication device, at least some of the subcarriers by scaling a pilot signal using a corresponding inversion factor.

In yet another example aspect, a method of wireless communication is disclosed. The method includes transmitting, to a first communication device, from a second communication device, a number of subcarriers, each subcarrier including a corresponding reference signal; receiving, from the first communication device, at least some of the subcarriers carrying pilot signals scaled by inversions factors for the subcarriers; and estimating a communication channel between the second communication device to the first communication device using the inversion factors.

In yet another example aspect, a wireless communication apparatus that implements the above-described methods is disclosed.

In yet another example aspect, the methods may be embodied as processor-executable code and may be stored on a computer-readable program medium.

In yet another example aspect, a wireless communication system that operates by providing a single pilot tone for channel estimation is disclosed.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

Figure 1:
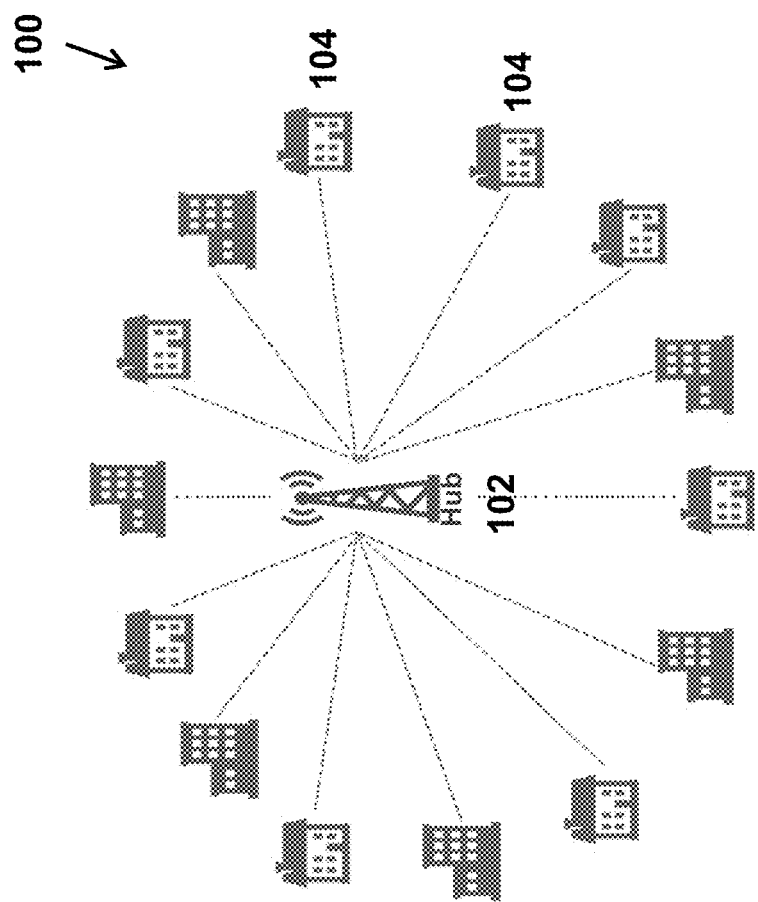
FIG. 1 shows an example of a fixed wireless access network.

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or embodiments (and/or implementations) to the respective sections only.

Channel knowledge is an important component in wireless communication, whether it is for a receiver to equalize and decode the received signal, or for a multi-antenna transmitter to generate a more efficient precoded transmission.

Typically, channel knowledge is acquired by transmitting known reference signals (pilots) and interpolating observations and results obtained by receiving them at the receiver over the entire bandwidth and time of interest. The density of the reference signals may depend on the characteristics of the channel. Higher delay spreads and higher Doppler spreads may require denser reference signals along frequency and/or time respectively, thus, occupying a considerable amount of the available capacity.

For example, consider a downlink multi-carrier transmission from a base-station to multiple users. In this case, depending on channel conditions, the reference signals should be dense enough in the time-frequency grid to allow the users to correctly estimate the channel and equalize the data (e.g., the estimation error due to interpolation of channel estimates along the time-frequency grid should be minimized). Another example is that of an uplink transmission from multi-users to a base station equipped with multi-antennas, where each user needs to allocate resource elements for its own reference signals.

In this document, we propose (i) an efficient method for estimating the channel from a very small set of resource elements, using the second-order statistics of the channel, and (ii) using the second-order statistics to reciprocally calibrate the wireless channel. The effectiveness of (i) increases with increased number of antennas at the base-station. As further described below, in some cases, it may be possible to send a single reference signal (tone) from the transmit antenna to each receive antenna at the base station, and be able to determine channel at different times and in different frequency bands based on the channel estimate obtained from the single (or, in general, reduced number of) reference tones. The efficacy of (ii) is based on deriving knowledge of the non-reciprocal parts of a channel between two nodes, and adjusting the channel response such that precoding may be used for the transmissions.

In the description, the example of a fixed wireless access (FWA) system is used only for illustrative purpose and the disclosed techniques can apply to other wireless networks, such as cellular or mobile communication networks further described in the present document.

FIG. 1 shows an example of a fixed wireless access system 100. A hub 102, that includes a transmission facility such as a cell tower, is configured to send and receive transmissions to/from multiple locations 104. For example, the locations could be user premises or business buildings. As described throughout this document, the disclosed embodiments can achieve very high cell capacity fixed wireless access, when compared to traditional fixed access technology. Some techniques disclosed herein can be embodied in implementations at the hub 102 or at transceiver apparatus located at the locations 104.

Figure 2:
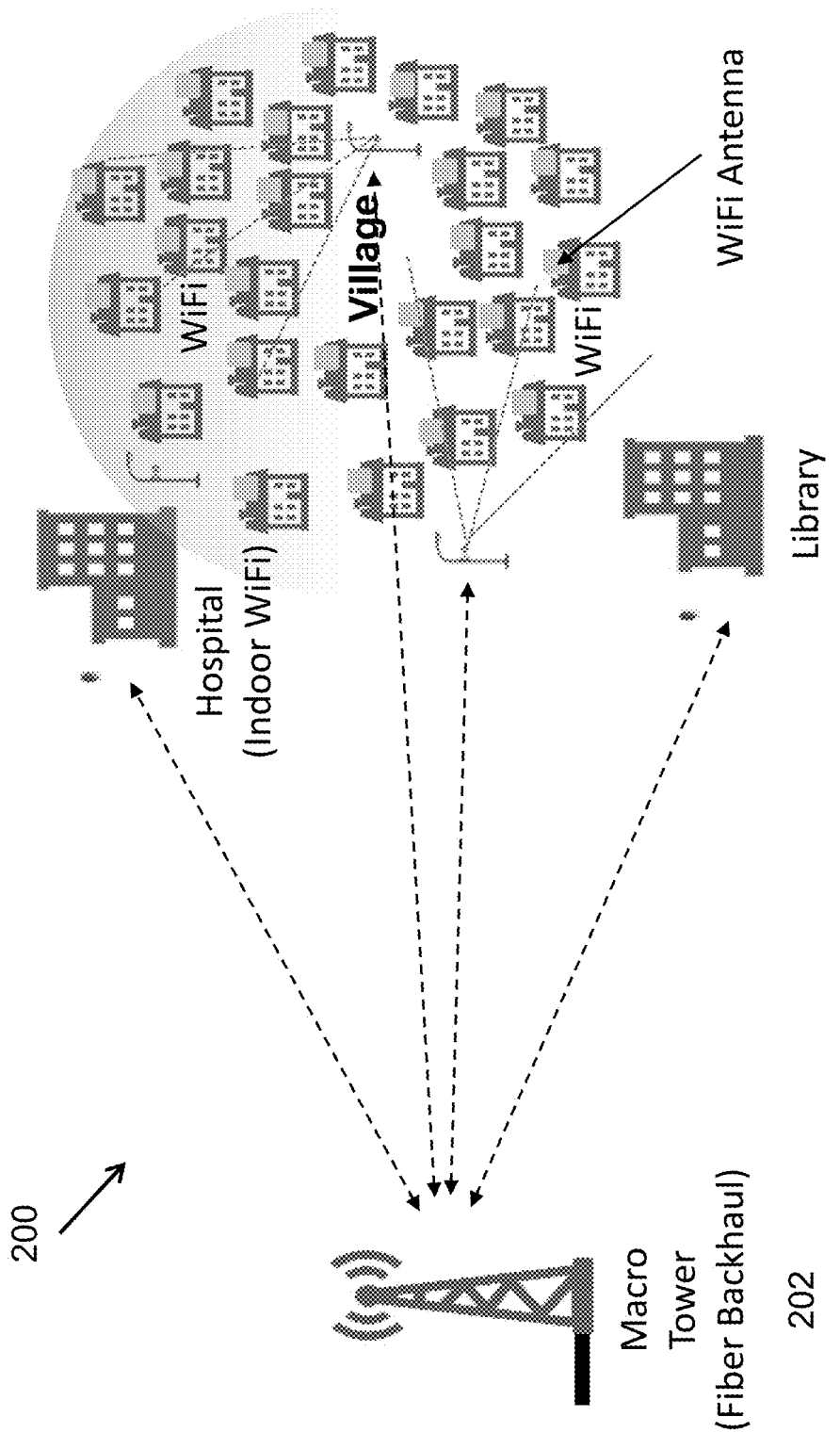
FIG. 2 shows another example of a fixed wireless access network.

FIG. 2 shows yet another configuration of a fixed access wireless communication system 200 in which hops are used to reach users. For example, one cell tower may transmit/receive from another cell tower, which would then relay the transmissions between the principle cell tower and the users, thus extending range of the fixed wireless access system. A backhaul may connect the transmission tower 202 with an aggregation router. For example, in one configuration, a 10 Gbps fiber connection may be used to feed data between a base station at a hub and a fiber hub aggregation router. In one advantageous aspect, deployment of this technology can be achieved without having to change any network bandwidth characteristics for harder to reach areas by using the hub/home access point (AP) configuration as a launch point. Some techniques disclosed herein can be embodied in implementations at the macro tower 202 or at transceiver apparatus located at the other locations.

Figure 3A:
FIG. 3A shows an example of a wireless channel between a transmitter and a receiver device.
Figure 3B:
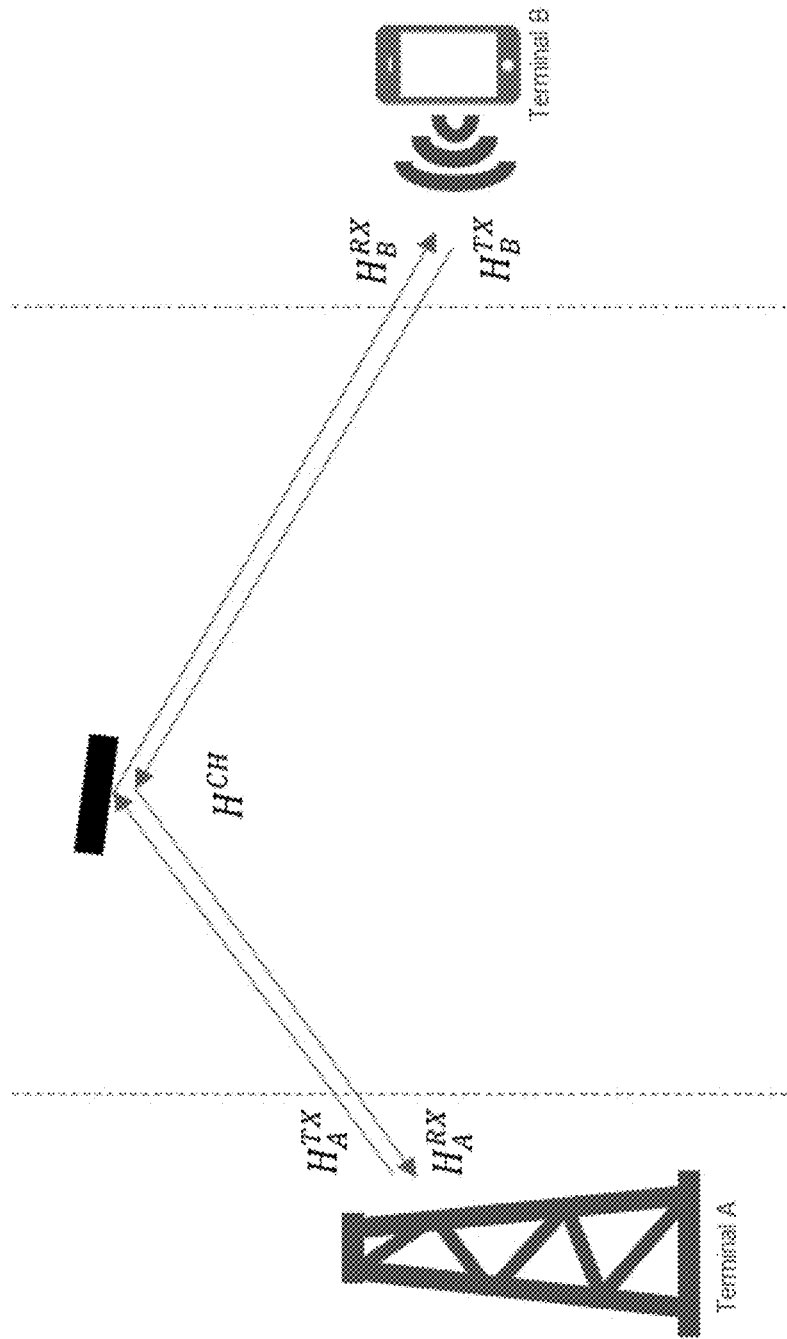
FIG. 3B shows another example of a wireless channel between a transmitter and a receiver device.
Figure 3C:
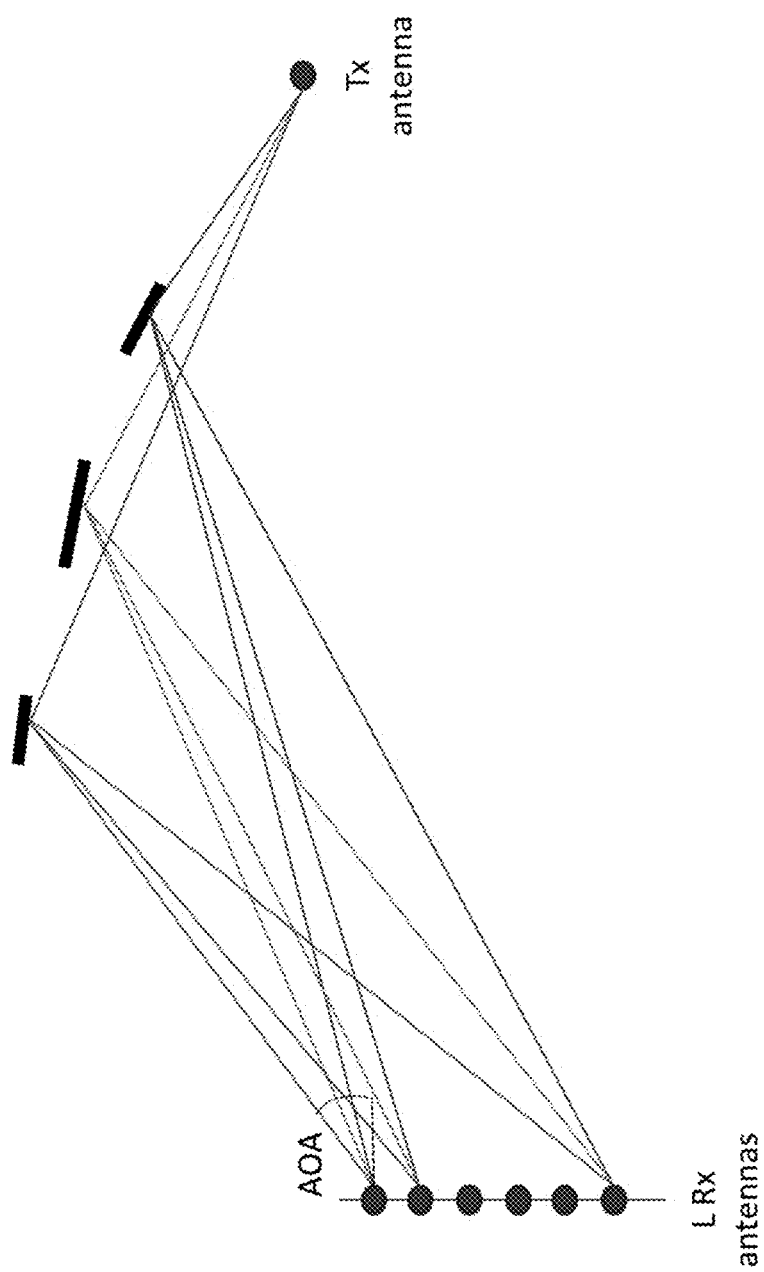
FIG. 3C shows an example of a wireless channel between a single transmit antenna and multiple receive antennas.

1. Introduction to Embodiments for Reciprocal Calibration for Channel Estimation Based on Second-Order Statistics FIGS. 3A, 3B and 3C show simplified wireless networks to highlight certain aspects of the disclosed technology. A transmitter transmits wireless signals to a receiver in the wireless network. Some transmissions in the network, variously called as downstream or downlink transmissions, a network-side node such as a base station acts as a transmitter of wireless signals and one or more user devices act as the receiver of these wireless signals. For some other transmissions, as depicted in FIG. 3A, the direction of transmission may reverse. Such transmissions are often called uplink or upstream transmissions. For such transmissions, one or more user devices act as transmitters of the wireless signals and a network-side node such as the base station acts as the receiver of these signals (as depicted in FIG. 3A). Other type of transmissions in the network may include device-to-device transmissions, sometimes called direct or sideband transmissions. In frequency division multiplexing (FDM) networks (also called frequency division duplexing or FDD networks), the transmissions to a base station and the transmissions from the base station may occupy different frequency bands (each of which may occupy continuous or discontinuous spectrum). In time division multiplexing (TDM) networks (also called time division duplexing, or TDD, networks), the transmissions to a base station and the transmissions from the base station occupy a same frequency band, but are separated in time domain using a TDM mechanism such as time slot based transmissions. Other types of multiplexing are also possible (e.g., code division multiplexing, orthogonal time frequency space, or OTFS, multiplexing, spatial multiplexing, etc.). In general, the various multiplexing schemes can be combined with each other.

From the early days of single antenna systems in which the transmitting user device had a single transmission antenna and the receiving base station had a single receiving antenna for that signal, wireless systems have now evolved to configurations in which transmitters have multiple transmit antennas and receivers have multiple receive antennas. Such systems are often called multiple input multiple output (MIMO) systems. In a MIMO system, a wireless channel may therefore be representable as a matrix that acts on a vector representing the multiple inputs and produces the vector representing the multiple outputs. Depending on channel conditions, some entries of the channel matrix may change over time.

The wireless systems described in this document, subjected to some interference, are known to be able to achieve the channel capacity if the interference is known to the transmitter. By using a technique known as dirty paper coding (DPC), the transmitter can precode a transmission such that the signal arriving at the receiver is interference-free. In reality, a more implementation-friendly approximation of DPC known as Tomlinson-Harashima Precoding (THP) is likely to be used (and is discussed in a subsequent section of this document).

A precoded transmission is based on the knowledge of the exact channel response between the transmitting antenna(s) of a first terminal denoted by A—typically a base-station (BS)—to the receiving antenna(s) of a second terminal denoted by B—typically a piece of Consumer Premises Equipment (CPE) or a user equipment (UE). This channel response can be considered to be composed of three different parts as illustrated in FIG. 36. First, the channel response of the transmitter in terminal A. Second, the channel response of the different reflectors. Third, the channel response of the receiver in terminal B. The transmitter channel responses may be due to the transmit chain circuitry such as power amplifiers, digital to analog converters (DACs), frequency upconverters and so on. The receiver channel response may be due to receiver-side circuitry such as low noise block (LNB), frequency downconverter, analog to digital conversion circuitry (ADC).

1.A. Second-Order Statistics

Without any loss of generality, let's consider a basic setup with a transmitter (e.g., a user device) using a single antenna and a receiver (e.g., a base station) with L antennas. If the transmitter (e.g., user device) has more than one antenna, then each antenna can be referred to as a separate transmitter.

Prior to the transmission of data, the system performs a preliminary training phase, where the second-order statistics of the channels between the transmitter and each one of the L receiver antennas are computed.

FIG. 3C shows an example of the basic setup in which the receiver comprises L receive antennas and the transmitter comprises a single transmit antenna. The signal transmitted from the transmitter is reflected (and dispersed) by a number of reflectors that give the wireless channel its characteristics. As further discussed in this document, the reflectors may be static or mobile, and have time-variant reflective characteristics.

In this initial phase, or training phase, the transmitter sends known reference signals, enabling the receiver to estimate the channel across all the bandwidth of interest and all the antennas. One example is in a multi-carrier scenario where the bandwidth of interest is represented with $N_f$ discrete tones, at time instance k the receiver will estimate the channel response $h_k$ as a complex column vector of size $N=N_f \cdot L$. This step may be repeated $N_{SOS}$ times and afterwards, the second-order statistics may be computed. Two different methods for this computation are proposed here as an example:

Direct method—In this method, the covariance matrix is calculated by arranging all channel responses as columns of the transfer matrix H and computing the cross correlation as:

$$H=[h_1|h_2|\ldots|h_{N_{SOS}}] \quad (1)$$

$$R_{HH}=H \cdot H^* \quad (2)$$

Average method—using this method, an average over $N_{SOS}$ of the variance of each channel response are calculated.

$$R_{HH} = \frac{1}{N_{SOS}} \sum_{k=1}^{N_{SOS}} h_k \cdot h_k^* \quad (3)$$

The covariance matrix $R_{HH}$ is large with dimensions N×N. For example, in a 4 antenna system in which 8 tones are used for reference signal transmissions, N=32, and thus $R_{HH}$ is a 32×32 matrix. However, the matrix encodes only a very small amount of information originating from the delay-Doppler profile and angle of arrival/departure of the reflectors of the wireless channel. These essential parameters of the channel can be extracted from the covariance matrix using a mathematical operation such as the Principal Component Analysis (PCA). For example, these parameters may be identified by computing the dominant eigenvalues and their corresponding eigenvectors of $R_{HH}$. For extracting K dominant reflectors, $R_{HH}$ may be approximated by $$R_{HH} \approx V \cdot D \cdot V^* \quad (4)$$

where V is an N×K eigenvectors matrix and D is the corresponding K×K eignenvalues diagonal matrix.

1.B. Channel Estimation Using a Small Set of Resource Elements

Once the second-order statistics of the channels between the transmitter and the receivers' L antennas are computed, the transmitter (e.g., a single transmit antenna of a user device) may transmit only a very small set of known reference signals, from which the receiver will be able to estimate all the channels (to all the antennas and across all the bandwidth). The general rule of thumb is that the receiver will use at least K measurements to sense the parameters of the K dominant reflectors.

More formally, let $\mathcal{M} = (m_1, m_2, \ldots)$ be a set of frequency elements (tones), where $m_i$ takes values in the range [1, 2, ..., $N_f$]. Note that the size of $\mathcal{M}$, denoted by $|\mathcal{M}|$, depends on different parameters such as the number of antennas L, the number of reflectors K, their delay profile and their angle of arrival (AOA) to the receiver antennas. Typically, $|\mathcal{M}|$ is very small and in some cases, may even be equal one (a single tone!).

The transmission of a small set of known reference signals over the tones of $\mathcal{M}$ is received over the L receiver's antennas. Let us define by $M = |\mathcal{M}| \cdot L$ the number of received reference values, corresponding to this transmission. Using the second-order statistics, an interpolation MMSE filter, C, can be computed from these M received elements to estimate the channel over all the N elements. Let $H_M$ be the channel response over these M received elements. Then, C may be computed as $$C = R_{HH_M} \cdot (R_{H_M H_M})^{-1} \quad (5)$$

where $R_{HH_M}$ and $R_{H_M H_M}$ corresponds to decimated versions of the full $R_{HH}$ matrix (one or two of the dimensions is reduced to M).

The PCA approximation for the second-order statistics can be useful to reduce the complexity of such a computation. Let $V_M$ be the matrix V decimated along its N dimension to M. Then, C can be expressed as $$C = V \cdot D \cdot V^*_M \cdot (V_M \cdot D \cdot V^*_M)^{-1} = V \cdot (V_M)^{-1} \quad (6)$$

The last computation requires inverting $V_M$, which has the dimensions of M×K. However, by algebraic manipulation, the inverted matrix may be even further reduced to a size of K×K $$C = V \cdot (V^*_M \cdot V_M)^{-1} \cdot V^*_M \quad (7)$$

Finally, the full channel response is obtained by computing $$H = C \cdot H_M \quad (8)$$

1.C. Estimating the Sufficient Number of Resource Elements

The receiver may use different methods, to estimate the required number of (time-frequency) resource elements in $\mathcal{M}$, to provide a sufficient quality of channel estimation. One method to do this, is to compute the error covariance matrix $$R_E = V \cdot D \cdot V^* - C \cdot V_M \cdot D \cdot V^* = (V - C \cdot V_M) \cdot D \cdot V^* \quad (9)$$

and use it to compare the mean energy along the diagonal to a threshold $$d_{R_E} = \text{diag}(R_E) \quad (10)$$

$$\overline{R_E} \triangleq \frac{1}{N} \sum_{i=1}^{N} |d_{R_E}(i)|^2 < TH \quad (11)$$

This criterion may be used to determine whether the number of elements in M is sufficient. Afterwards, the receiver may instruct the transmitter to adjust the number of required reference signals to transmit.

Figure 4:
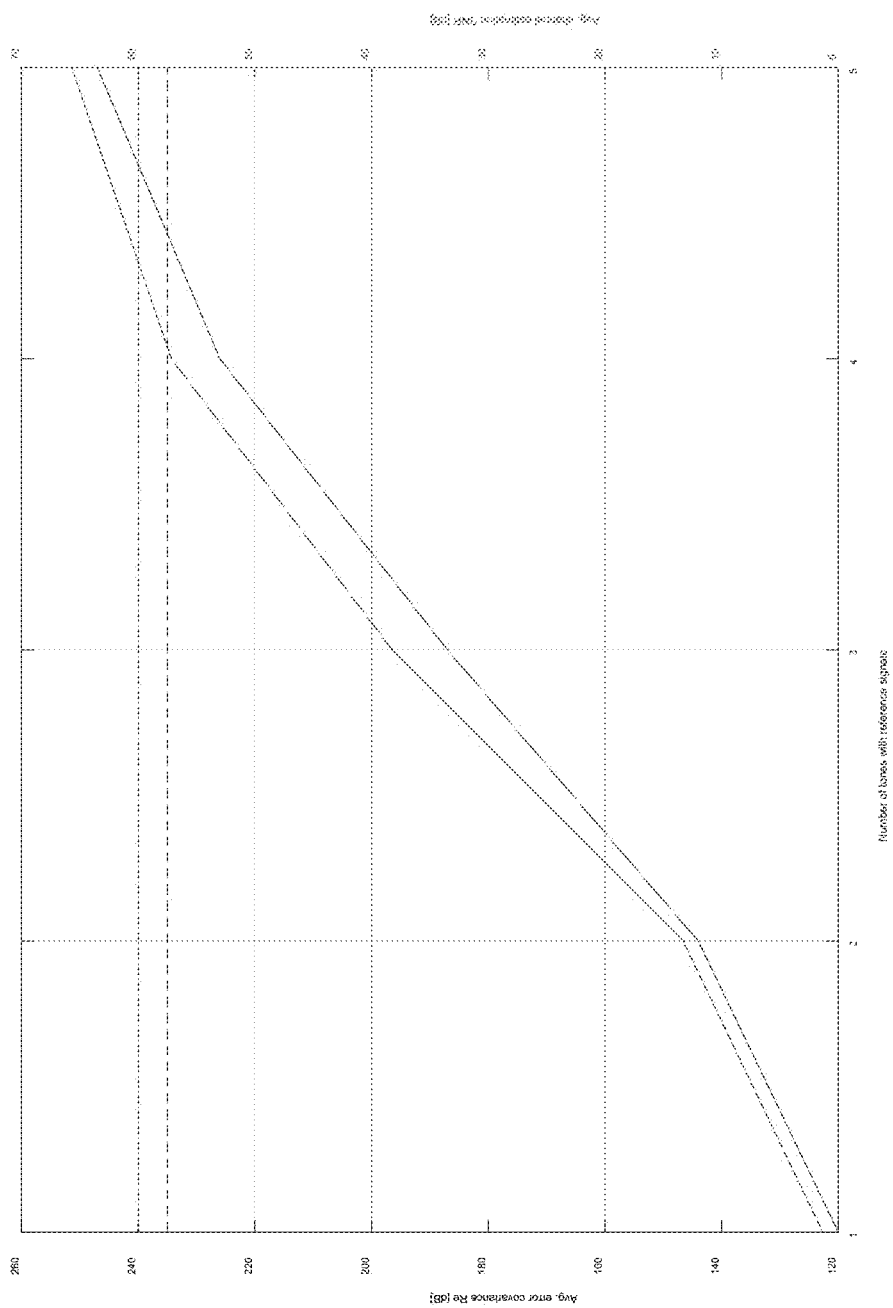
FIG. 4 is a graph showing an example of effect of number of tones used for reference signal transmissions on average error covariance.

To illustrate this concept, an extreme case of channels with many reflectors and small angle-of-arrivals was examined with different number of tones allocated for reference signals. White Gaussian noise was added to the received signal, creating a signal-to-noise (SNR) ratio of 60 dB. The graph in FIG. 4, shows for a varying number of tones with reference signals (1 to 5), the computed values of the average error covariance and the average estimation SNR (inverse of mean-square-error compared to the true channel). The computed average error covariance, $\overline{R_E}$, can be roughly compared to a threshold of 235 dB, afterwards the noise contribution of the estimated channel is smaller than that of the AWGN. Therefore, for this example, it would be recommended to use 5 tones with reference signals.

1.D. Embodiments for Prediction in FDD/TDD Networks

The methods described in the previous sections may also be applied directly for efficient channel prediction. Channel prediction may include a training phase, where reference signals are transmitted over two different time-frequency resources sets and the second-order statistics is computed for the corresponding channels. These sets may include two non-overlapping frequency bands, two different time instances, or a combination of both. For example, in FDD networks, downlink and uplink transmissions use different frequency bands, and channel characteristics over one of downlink/uplink channel could be predicted based on observed channel estimates over the other (uplink or downlink) channel.

Let $h_{k,1}$ represent a column vector of the channel response over $N_{f1}$ frequency tones and L antennas, across a first frequency band and at time instance $T_k$ (first set) and $h_{k,2}$ as a column vector of the channel response over $N_{f2}$ frequency tones and L antennas, across a second frequency band and at time instance $T_k + \Delta$ (second set). A matrix H can be formulated as the concatenation of these column vectors from multiple training sessions and compute the covariance matrix $R_{HH}$.

$$H = \begin{bmatrix} h_{1,1} | h_{2,1} | & & | h_{N_{SOS},1} \\ h_{1,2} | h_{2,2} | & \cdots & | h_{N_{SOS},2} \end{bmatrix} \quad (12)$$

$$R_{HH} = H \cdot H^* \quad (13)$$

The procedure described in previous sections, may be fully applied here as well. PCA may be applied to $R_{HH}$ for K dominant reflectors. In the operational phase, the transmitter may send a small set of reference signals, m, over part of the first time-frequency set and use the computed interpolation filter $$C = R_{HH_M} \cdot (R_{H_M H_M})^{-1} \quad (14)$$

$$H = C \cdot H_M \quad (15)$$

to estimate the channel across the entire second time-frequency set.

For example, after a training session, multiple user devices are transmitting their small set of resources to the base station, where it is used for predicting future channels in a different band (FDD) or in the same band (TDD). The base station uses the predicted channels to compute a precoded transmission back to the users.

This method may also be applied for non-direct prediction techniques. For example, as a first step, the second-order statistics of the channel may be computed from full-band reference signals. Then, small sets of reference signals at both time-frequency sets are transmitted. The received signals in each set, consisting of M elements may be further compressed to K elements by computing $$H_K = (V_M)^{-1} \cdot H_M \tag{16}$$

Then, the covariance matrices of the two sets and the cross-covariance matrix may be computed along with an interpolation filter from one set to the other $$R^{(1)} = H_K^{(1)} \cdot (H_K^{(1)})^* \tag{17}$$

$$R^{(2,1)} = H_K^{(2)} \cdot (H_K^{(1)})^* \tag{18}$$

$$C^{(2,1)} = R^{(2,1)} \cdot (R^{(1)})^{-1} \tag{19}$$

Finally, the channel in the second set is predicted from the channel in the first set $$H_K^{(2)} = C_{(2,1)} \cdot H_K^{(1)} \tag{20}$$

and computed over all the N elements $$H = V \cdot H_K^{(2)} \tag{21}$$

1.E. Channel Responses and Channel Reciprocity

There are two main differences between the channel responses at terminals A and B and the channel response of the wireless channel reflectors:

1. The channel response of the wireless channel reflectors in a time-division duplex (TDD) system is reciprocal whereas the channel response of the terminals is not.
2. The channel response of the wireless channel reflectors may change rapidly (e.g., in 1-10 milliseconds, depending on the Doppler of the reflectors and terminals), but the channel response of the terminals changes slowly, mostly with temperature.

There are several methods for obtaining the complete channel response from terminal A to B described in the literature. For example, an explicit method would be to send known reference signals from terminal A to B and have terminal B transmit back the values of the received reference signals to terminal A. This is often referred to as explicit feedback. However, each value must be represented with multiple bits, and in a system where terminal A has many antennas, there are many user terminals and significant Doppler effects causing the propagation channel to change rapidly, the amount of information that needs to be transmitted can severely reduce the overall system efficiency. In the extreme case with high levels of Doppler, it is simply not possible to feedback all the required Channel State Information (CSI) quickly enough, resulting in stale CSI and suboptimal precoding.

Instead, a TDD system can use an approach known as "reciprocity calibration" to obtain the relationship between the non-reciprocal parts of the channel response in both transmission directions: the AB (from A to B) and the BA (from B to A). Terminal B first transmits known reference signals that allow terminal A to compute the AB channel response. Using knowledge of the non-reciprocal relationship, terminal A can adjust the BA channel response to make it suitable for precoding a transmission back to terminal B.

More formally, for a multi-carrier TDD system that uses multi-carrier modulation, where the channel can be described as a complex value in the frequency domain for a specific sub-carrier (tone), the three components of the AB channel response can be denoted as $H_A^{TX}$, $H^{CH}$ and $H_B^{RX}$. Similarly, the three components of the BA channel response are $H_B^{TX}$, $H^{CH}$ and $H_A^{RX}$. The overall downlink (AB) channel response is $$H_{AB} = H_A^{TX} \cdot H_{CH} \cdot H_B^{RX} \tag{22}$$

and the overall uplink (BA) channel response is $$H_{BA} = H_B^{TX} \cdot H^{CH} \cdot H_A^{RX} \tag{23}$$

From $H_{AB}$ and $H_{BA}$, the reciprocity calibration factor can be written as $$\alpha = \frac{H_A^{TX} \cdot H_B^{RX}}{H_B^{TX} \cdot H_A^{RX}} \tag{24}$$

Therefore, if $H_{BA}$ is known at terminal A, it can compute $H_{AB} = \alpha H_{BA}$. The question that remains is how to obtain $\alpha$. Note that for the multi-carrier system, the above Equations (22) to (24) will provide reciprocity calibration values and channel responses on a per sub-carrier basis for sub-carriers on which reference signals are transmitted.

Different methods exist within the literature for computing the reciprocity calibration factor. The most straight forward of these is to utilize explicit feedback as described above, but only feed back $H_{AB}$ when $\alpha$ is re-calculated. Since the transmitter and receiver channel responses change relatively slowly, the rate of feedback is typically in the order of minutes and thus represents negligible overhead for a modest number of terminals and antennas. However, when the number of antennas in terminal A and the number of CPEs (terminal B) is large, as can be the case in a massive multiple-input multiple-output (MIMO) system with many subscribers, the feedback overhead can consume a considerable portion of the system capacity.

Another approach is to have terminal A transmit reference signals between its own antennas and calculate calibration factors for only $H_A^{TX}$ and $H_A^{RX}$. That is, obtain:

$$\alpha_A = \frac{H_A^{TX}}{H_A^{RX}} \tag{25}$$

which results in $$\tilde{H}_{AB} = \alpha_A \cdot H_{BA} = H_A^{TX} \cdot H_A^{TX} \cdot H^{CH} \tag{26}$$

Terminal A will then precode one reference symbol using $\tilde{H}_{AB}$ that terminal B can use to remove its $H_B^{TX}$ and $H_B^{RX}$ contributions from all subsequent precoded transmissions. This technique may be called relative calibration. Whilst this approach entirely removes the need for feedback of $H_{BA}$, the need for terminal A to transmit to itself during a calibration procedure and then to CPEs that could be located many hundreds of meters or even kilometers away can create dynamic range challenges. It is typically desirable to use the same hardware gain stages in the transmit chain when calibrating as those used for transmission, since having to switch gain stages between calibration and transmission can change the nature of $H_A^{TX}$ and $H_A^{RX}$.

This document describes, amongst other embodiments and approaches, a new approach for computing the reciprocity calibration factor that avoids the dynamic range concern of relative calibration whilst maintaining high levels of efficiency when scaling to a larger number of antennas and terminals. As described herein, the reference signals transmitted for calibration and at the same power level as typical signal transmissions, and hence are better suited to capture and calibrate the distortions introduced by transmit/receive circuitry.

1.F. Reciprocity Calibration Via Receiver-Side Inversion

Let Terminal A transmit known reference signals over a subset of multi-carrier tones and P be a specific reference signal at one of these tones. For example, Terminal A may use every Mth subcarrier for reference signal transmission, where M is an integer. For example, M may be 8 or 16 in practical systems. Terminal B receives $$Y_B = H_{AB} \cdot P + W \tag{27}$$

where W is additive white Gaussian noise with zero mean and variance $N_0$. Note that the above equation is a scalar equation because the equation represents the received signal at a single subcarrier. For each subcarrier on which a reference is transmitted, there will be one such equation. Terminal B estimates $H_{AB}$ from $Y_B$ and inverts it. To avoid singularities and cope with a large dynamic range, regularized zero forcing may be used to compute the inversion:

$$\tilde{H}_{AB}^{-1} = \frac{H_{AB}^*}{H_{AB}^* \cdot H_{AB} + N_0} \approx H_{AB}^{-1} \tag{28}$$

Terminal B then transmits $\tilde{H}_{AB}^{-1}$ back to terminal A over the same tone. This transmission should quickly follow the first one—especially in the presence of Doppler—to ensure $H^{CH}$ remains relatively constant. Terminal A then receives $$Y_B = H_{BA} \cdot \tilde{H}_{AB}^{-1} + W \tag{29}$$

Ignoring the noise term, which may be averaged out over multiple transmissions, it can be seen that $Y_B$ is the inverse of the reciprocity calibration factor:

$$Y_B \approx \frac{H_B^{TX} \cdot H^{CH} \cdot H_A^{RX}}{H_A^{TX} \cdot H^{CH} \cdot H_B^{RX}} = \frac{H_B^{TX} \cdot H_A^{RX}}{H_A^{TX} \cdot H_B^{RX}} = \alpha^{-1} \tag{30}$$

Since these are scalar values, the inversion processing is for both $H_{AB}$ and $Y_B$ is straightforward. Here, the inverse reciprocity calibration factor represents a ratio of circuitry channel from Terminal B to Terminal A, and a circuitry channel from Terminal A to Terminal B.

In multi-carrier systems, the above-described procedure may be repeated over multiple tones and the result interpolated to yield the full set of calibration factors over the bandwidth of interest. This full set may be obtained, for example, by averaging or interpolating the calibration factors are the subcarriers at which reference signals were transmitted. Since the Tx and Rx contributions of both terminal A and B will be relatively flat across frequency, it should be possible to use a sparse subgrid of tones with the appropriate interpolation to obtain an accurate level of calibration.

The results of the channel estimation as above may be combined with channel estimation of the $H^{CH}$ channel to obtain an estimate of the overall channel $H_{AB}$ and $H_{BA}$.

2. Wireless Precoded Communication for FDD Systems

Figure 5:
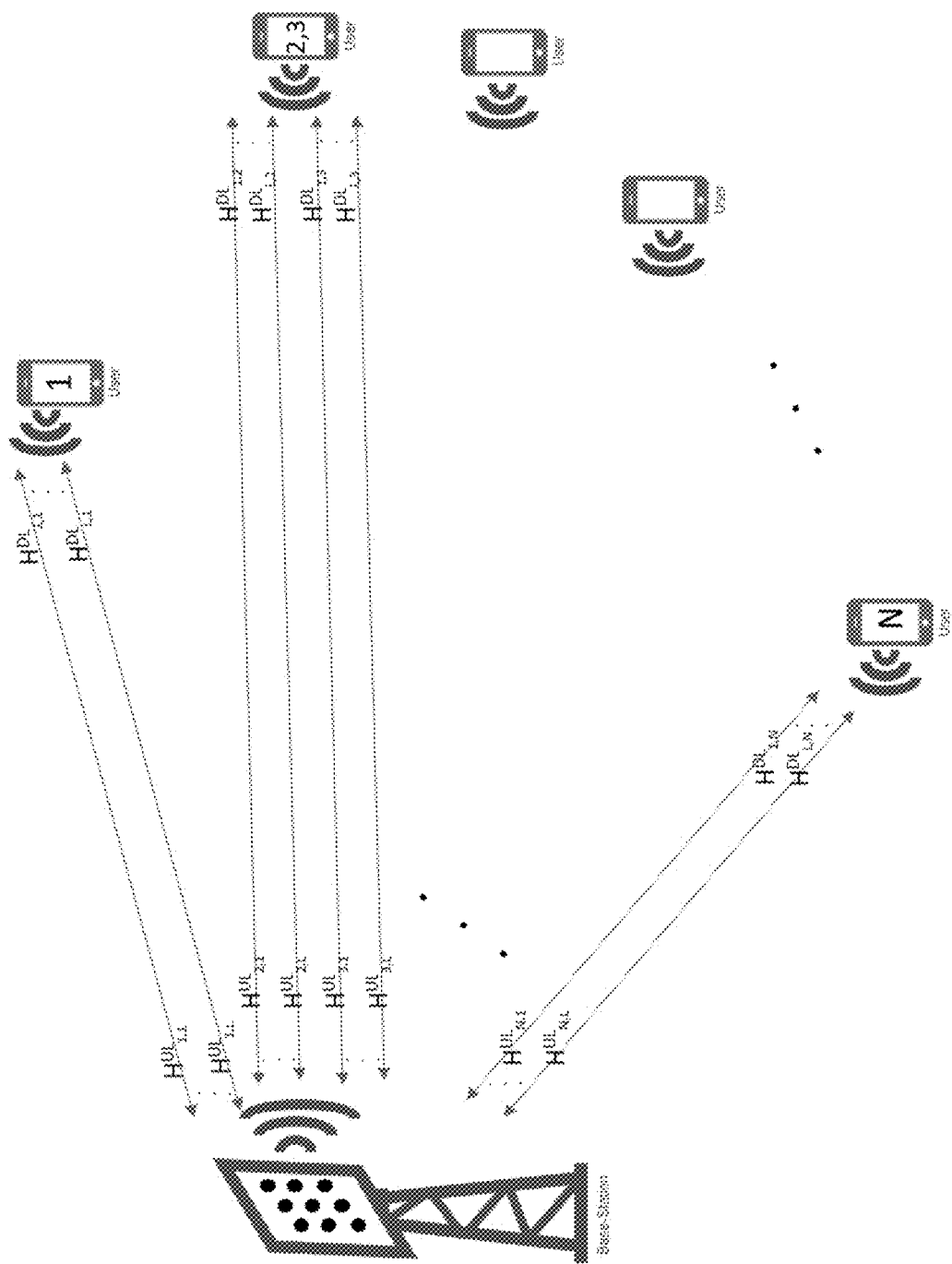
FIG. 5 shows an example of a mobile wireless communication network with a multi-antenna base-station and multiple user antennas.

A wireless system, with a multi-antenna base-station and multiple user antennas, is shown in FIG. 5. Each transmission from a user antenna to one of the base-station antennas (or vice versa), experiences a different channel response (assuming the antennas are physically separated enough). For efficient communication, the base-station improves the users' received Signal-to-Interference-Noise-Ratio (SINR) by means of precoding. However, to precode, the base-station needs to have an accurate estimation of the downlink channels to the users during the transmission time.

In FDD systems, two directions of transmissions may use two different (typically non-overlapping) frequency bands. These transmissions may include, for example, transmissions from a network-side node such as a base station or an access point to multiple user devices, often called the downlink direction, and transmissions from the multiple user devices to the network-side node, often called the upstream or uplink direction. The various embodiments described in the present document, and the attached appendices, perform signal processing to improve communication by, for example, estimating second order statistics of a wireless channel and using the estimate to perform precoding in an FDD system.

In the following subsections, an efficient system and a method for predicting the downlink channel for precoding in an FDD system is described.

2.A. Second-Order Statistics Training

Figure 6:
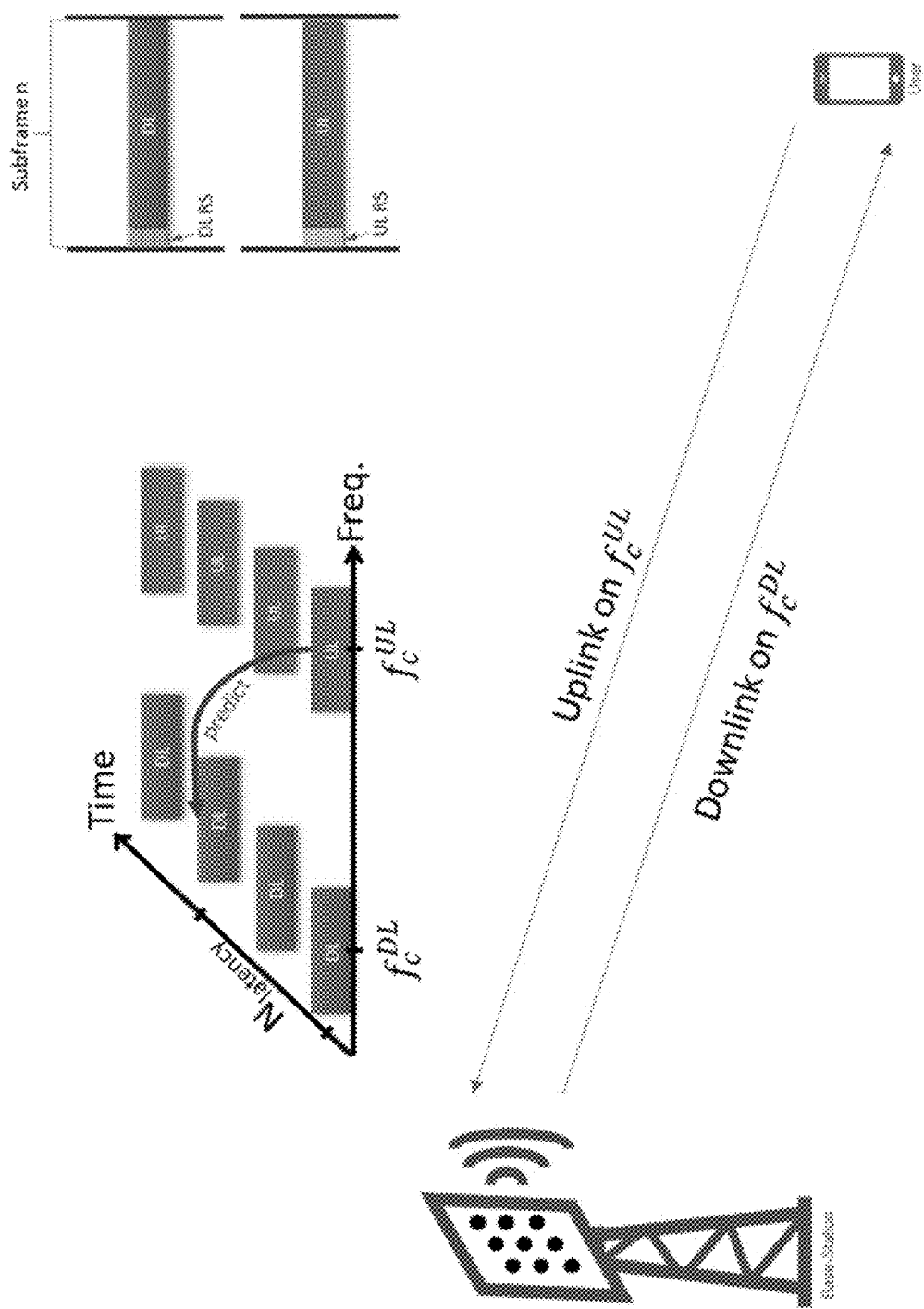
FIG. 6 shows an example of FDD prediction setup, wherein the base-station uses the channel response of the uplink to predict the channel response of the downlink in a different frequency and on a later subframe.

For simplicity, this section focuses on a single user antenna and the L base-station antennas. This can be easily extended to any number of users. The setup of the system is shown in FIG. 6. The base-station predicts from the uplink channel response, the downlink channel response in a different frequency band and $N_{latency}$ subframes later.

To achieve this, the system preforms a preliminary training phase, consisting of multiple sessions, where in each session i=1, 2, . . . , $N_{training}$, the following steps are taken:

At subframe n, the user equipment transmits reference signals (RS) in the uplink. The base-station receives them and estimate the uplink channel $H_{UL}^{(i)}$ over the L base-station antennas.

At subframe n+$N_{latency}$, the base-station transmits reference signals in the downlink from all its antennas. The user equipment receives it and sends it back as uplink data in a later subframe. The base-station computes the downlink channel estimation for it, $H_{DL}^{(i)}$. In a different implementation, it is possible that the UE will compute the channel estimation and send it to the base-station as uplink data.

The base-station computes the second-order statistics $$R_{UL}^{(i)} = H_{UL}^{(i)} \cdot (H_{UL}^{(i)})^H$$

$$R_{DL,UL}^{(i)} = H_{DL}^{(i)} \cdot (H_{UL}^{(i)})^H$$

$$R_{DL}^{(i)} = H_{DL}^{(i)} \cdot (H_{DL}^{(i)})^H$$

Herein, $(\cdot)^H$ is the Hermitian operator. For the case that the channel has non-zero-mean, both the mean and the covariance matrix should be determined.

When the training sessions are completed, the base-station averages out the second order statistics:

$$R_{UL} = \frac{1}{N_{training}} \sum_{i=1}^{N_{training}} R_{UL}^{(i)}$$

$$R_{DL,UL} = \frac{1}{N_{training}} \sum_{i=1}^{N_{training}} R_{DL,UL}^{(i)}$$

-continued $$R_{DL} = \frac{1}{N_{training}} \sum_{i=1}^{N_{training}} R_{DL}^{(i)}$$

Then, it computes the prediction filter and the covariance of the estimation error:

$$C_{prediction} = R_{DL,UL} \cdot (R_{UL})^{-1}$$

$$R_E = R_{DL} - C_{prediction} \cdot (R_{DL,UL})^H$$

The inversion of $R_{UL}$ may be approximated using principal component analysis techniques. We compute $\{\lambda\}$, the K most dominant eigenvalues of $R_{UL}$, arranged in a diagonal matrix $D=\text{diag}(\lambda_1, \lambda_2, \ldots, \lambda_K)$ and their corresponding eigenvectors matrix V. Typically, K will be in the order of the number of reflectors along the wireless path. The covariance matrix can then be approximated by $R_{UL} \approx V \cdot D \cdot (V)^H$ and the inverse as $R_{UL}^{-1} \approx V \cdot D^{-1} \cdot (V)^H$.

Note, that there is a limited number of training sessions and that they may be done at a very low rate (such as one every second) and therefore will not overload the system too much.

To accommodate for possible future changes in the channel response, the second-order statistics may be updated later, after the training phase is completed. It may be recomputed from scratch by initializing again new $N_{training}$ sessions, or by gradually updating the existing statistics.

The interval at which the training step is to be repeated depends on the stationarity time of the channel, i.e., the time during which the second-order statistics stay approximately constant. This time can be chosen either to be a system-determined constant, or can be adapted to the environment. Either the base-station or the users can detect changes in the second-order statistics of the channel and initiate a new training phase. In another embodiment, the base-station may use the frequency of retransmission requests from the users to detect changes in the channel, and restart the process of computing the second-order statistics of the channel.

2.B. Scheduling a Downlink Precoded Transmission

For each subframe with a precoded downlink transmission, the base-station should schedule all the users of that transmission to send uplink reference signals $N_{latency}$ subframes before. The base-station will estimate the uplink channel responses and use it to predict the desired downlink channel responses $$H_{DL} = C_{prediction} \cdot H_{UL}$$

Then, the downlink channel response $H_{DL}$ and the prediction error covariance $R_E$ will be used for the computation of the precoder.

3. Efficient Channel Estimation Using Second-Order Statistics

In some embodiments, channel knowledge is typically acquired by transmitting known reference signals (pilots) and interpolating them at the receiver over the entire bandwidth and time of interest. Typically, the density of the pilots depends on characteristics of the channel. Higher delay spreads require more dense pilots along frequency and higher Doppler spreads require more dense pilots along time. However, the pilots are typically required to cover the entire bandwidth of interest and, in some cases, also the entire time interval of interest.

Herein, a method based on the computation of the second-order statistics of the channel, where after a training phase, the channel can be estimated over a large bandwidth from reference signals in a much smaller bandwidth is proposed. Even more, the channel can also be predicted over a future time interval.

3.A. Second-Order Statistics Training for Channel Estimation

Figure 7:
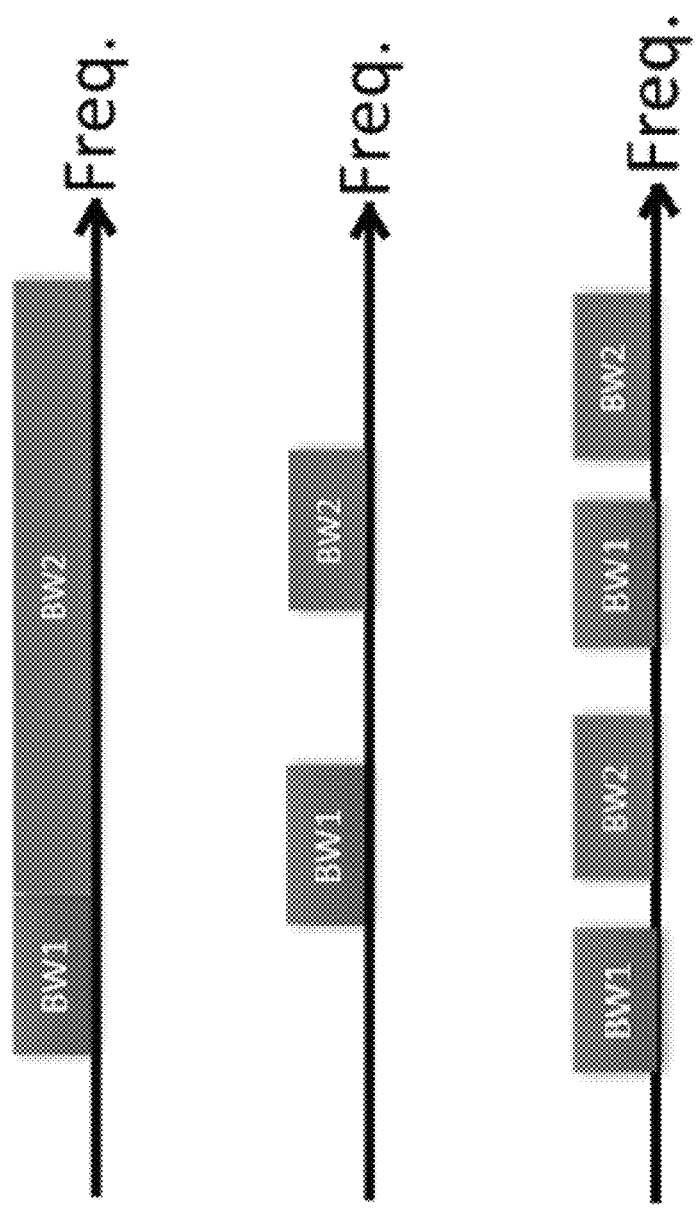
FIG. 7 shows examples of bandwidth partitions.
Figure 8:
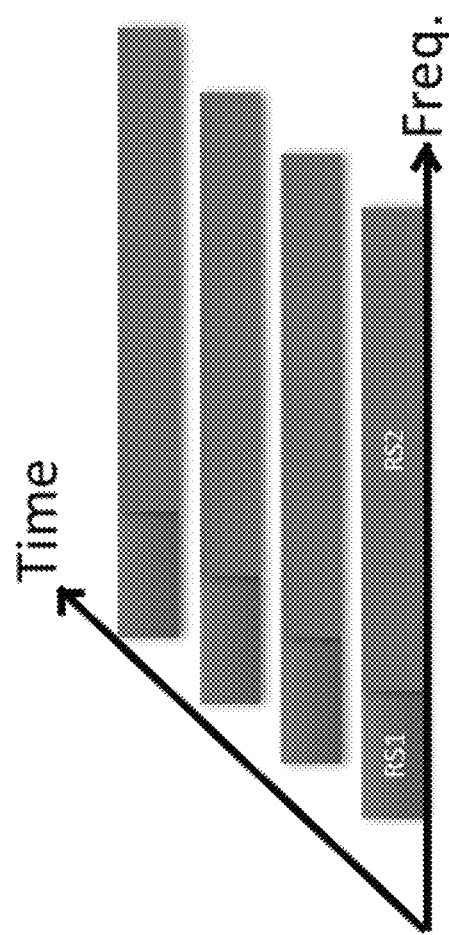
FIG. 8 shows an example of a bandwidth partition with the same time interval for reference signal (RS) 1 and RS2.
Figure 9:
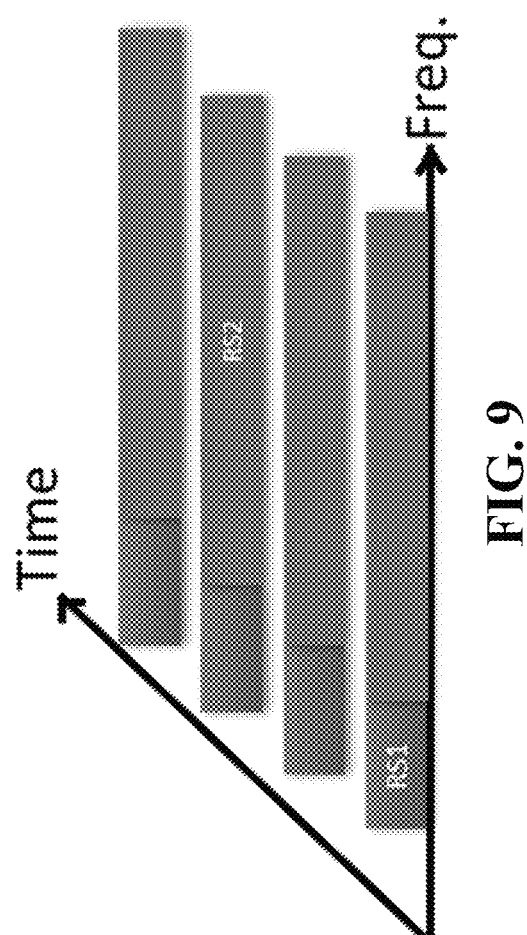
FIG. 9 shows an example of a bandwidth partition with different time intervals for reference signal (RS) 1 and RS2.

Similar to the embodiments described in Section 2.A, a system preforms a preliminary training phase, consisting of multiple sessions, where in each session $i=1,2,\ldots,N_{training}$ the following steps are taken:

The transmitter sends reference signals to the receiver. We partition the entire bandwidth of interest into two parts $BW_1$ and $BW_2$, as shown in FIG. 7, where typically the size of $BW_1$ will be smaller or equal to $BW_2$. Note, that these two parts do not have to from a continuous bandwidth. The transmitter may send reference signals at both parts at the same time interval (FIG. 8) or at different time intervals (FIG. 9).

The receiver receives the reference signals and estimates the channel over their associated bandwidth, resulting in channel responses $H_1^{(i)}$ and $H_2^{(i)}$.

The receiver computes the second-order statistics of these two parts:

$$R_1^{(i)} = H_1^{(i)} \cdot (H_1^{(i)})^H$$

$$R_{2,1}^{(i)} = H_2^{(i)} \cdot (H_1^{(i)})^H$$

$$R_2^{(i)} = H_2^{(i)} \cdot (H_2^{(i)})^H$$

Herein, $(\cdot)^H$ is the Hermitian operator. For the case that the channel has non-zero-mean, both the mean and the covariance matrix should be determined, as is further discussed in the attached appendices. When the training sessions are completed, the base-station averages out the second order statistics:

$$R_1 = \frac{1}{N_{training}} \sum_{i=1}^{N_{training}} R_1^{(i)}$$

$$R_{2,1} = \frac{1}{N_{training}} \sum_{i=1}^{N_{training}} R_{2,1}^{(i)}$$

$$R_2 = \frac{1}{N_{training}} \sum_{i=1}^{N_{training}} R_2^{(i)}$$

Then, the receiver computes a prediction filter:

$$C_{prediction} = R_{2,1} \cdot (R_1)^{-1}$$

and if needed, also the covariance of the estimation error $$R_E = R_2 - C_{prediction} \cdot (R_{2,1})^H$$

The inversion of $R_1$ may be approximated using principal component analysis techniques. We compute $\{\lambda\}$, the K most dominant eigenvalues of $R_1$, arranged in a diagonal matrix $D=\text{diag}(\lambda_1, \lambda_2, \ldots, \lambda_K)$ and their corresponding eigenvectors matrix V. Typically, K will be in the order of the number of reflectors along the wireless path. The covariance matrix can then be approximated by $R_1 \approx z$, $V \cdot D \cdot (V)^H$ and the inverse as $R_1^{-1} \approx V \cdot D^{-1} \cdot (V)^H$.

Note, that there is a limited number of training sessions and that they may be done at a very low rate (such as one every second) and therefore will not overload the system too much.

To accommodate for possible future changes in the channel response, the second-order statistics may be updated later, after the training phase is completed. It may be recomputed from scratch by initializing again new $N_{training}$ sessions, or by gradually updating the existing statistics.

The interval at which the training step is to be repeated depends on the stationarity time of the channel, i.e., the time during which the second-order statistics stay approximately constant. This time can be chosen either to be a system-determined constant, or can be adapted to the environment. Either the base-station or the users can detect changes in the second-order statistics of the channel and initiate a new training phase. In another embodiment, the base-station may use the frequency of retransmission requests from the users to detect changes in the channel, and restart the process of computing the second-order statistics of the channel.

3.B. Embodiments for Efficient Channel Estimation

After the training phase is completed, the transmitter may only send reference signals corresponding to $BW_1$. The receiver, estimated the channel response $H_1$ and use it to compute (and predict) and channel response $H_2$ over $BW_2$ using the prediction filter:

$$H_2 = C_{prediction} \cdot H_1$$

Figure 10:
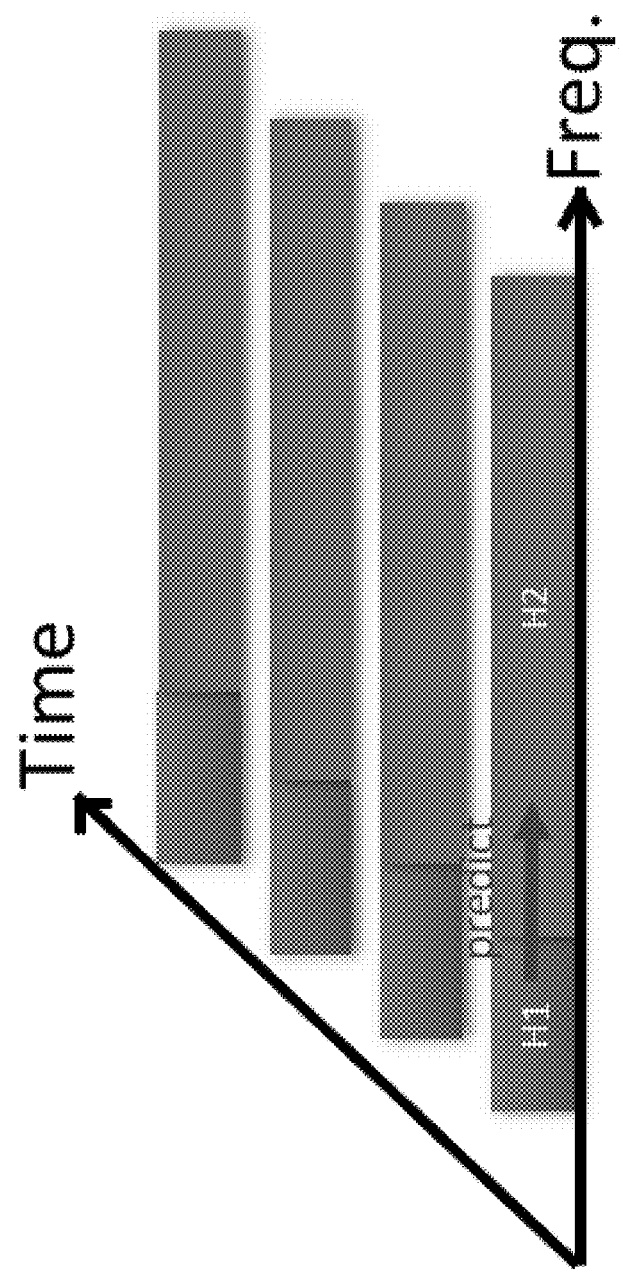
FIG. 10 shows an example of channel prediction over the same time interval.
Figure 11:
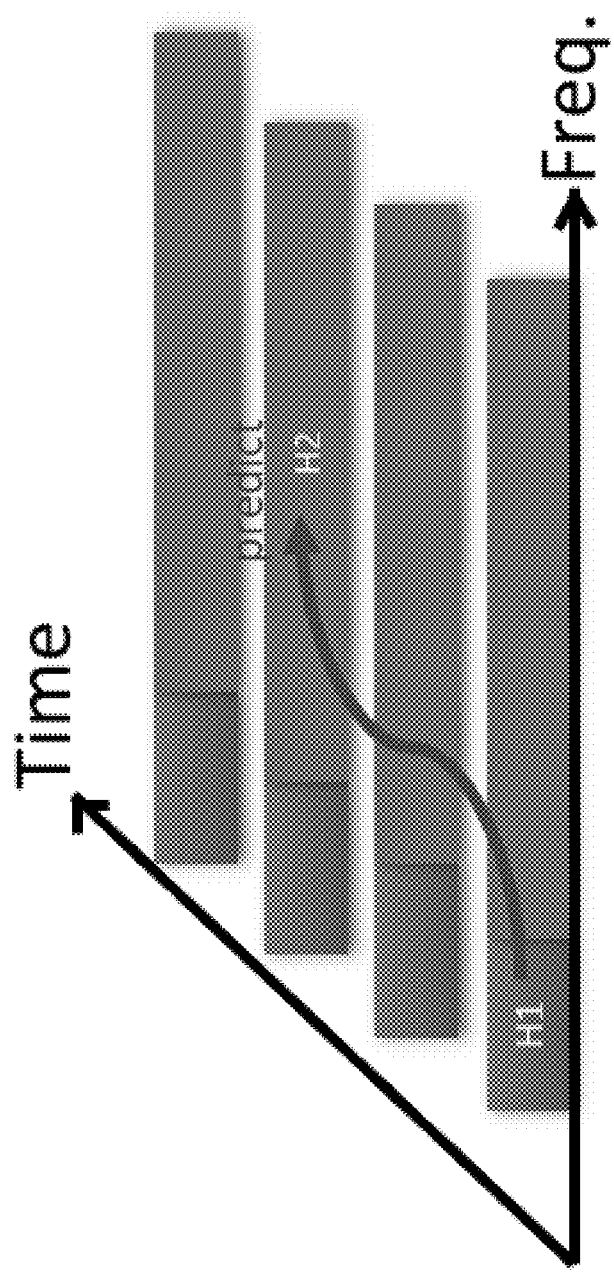
FIG. 11 shows an example of channel prediction over a different time interval.

FIGS. 10 and 11 describe example two prediction scenarios (same time interval and future time interval, respectively).

4. Reciprocal Calibration for Reverse Channel Estimation

In the operation of the wireless systems described in this document, n–1 signals, intended for n–1 individual UEs, will act as interference for the target UE. A transmit pre-coder cancels the interference generated at the target UE by the n–1 un-intended signals meant for other UEs. To build a pre-coder, down link channel state information (CSI) is used.

In an extrinsic beamforming technique, CSI is fed back from the UE to BS through a feedback up-link channel. However, considerable amount of data BW is used for this, thus affecting the overall system throughput efficiency.

For Time Division Duplex (TDD) systems, the physical channel in the air (sometimes called the radio channel) is reciprocal within the channel coherence time. i.e., the up-link (UE to BS) and down-link (BS to UE) are identical (in SISO (transpose in MIMO). However, when the transceiver front-end (FE) hardware is also taken into account, channel reciprocity no longer holds. This is due to the non-symmetric characteristics of the RF hardware. It includes PA non-linearity, RF chain crosstalk, phase noise, LNA non-linearity and noise figure, carrier and clock drifts etc.

In some embodiments, a calibration mechanism can be designed to calibrate for the nonreciprocal components of the wireless link such that embodiments can estimate the down-link by observing the up-link with the help of these calibration coefficients. If this is feasible, no CSI feedback is necessary (as in the case of extrinsic beam forming), thus improving the overall system throughput efficiency. The associated beamforming is also sometimes called intrinsic beamforming.

Figure 12:
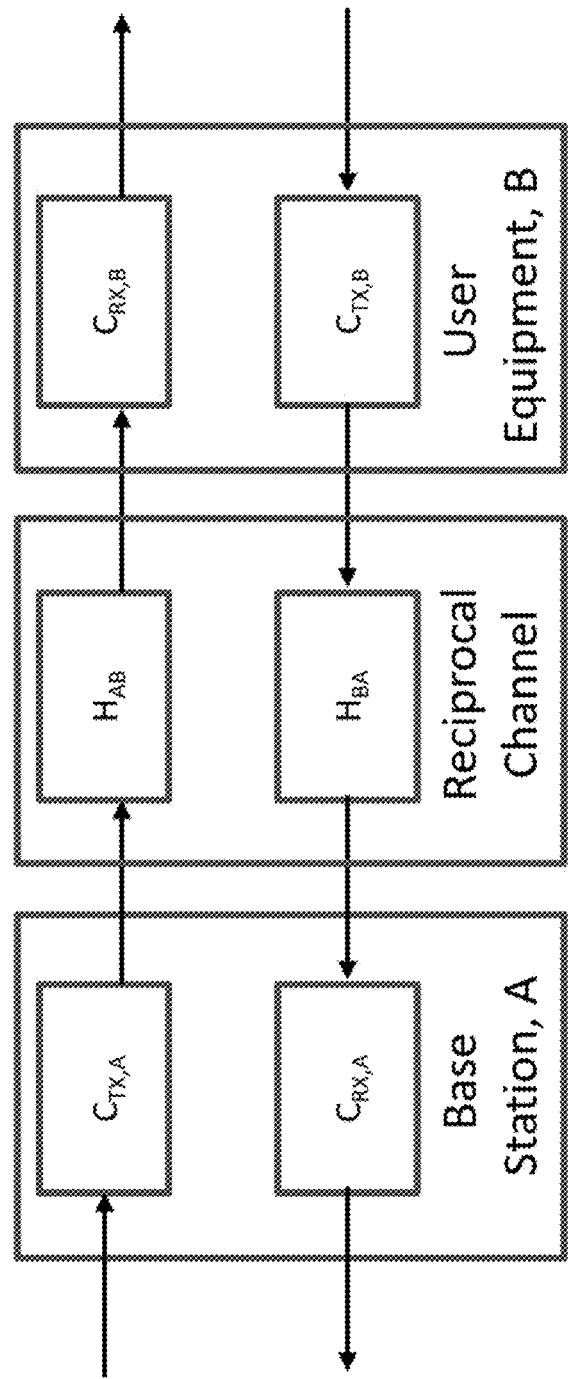
FIG. 12 shows an example of a wireless channel with reciprocity.

FIG. 12 shows an example block diagram of a communication channel with reciprocity. The composite wireless channel from A to B may be represented as: $\hat{H}_{A,B} = C_{RX,B} \cdot H_{A,B} \cdot C_{TX,A}$. For the reciprocal channel, it may be assumed that $H_{AB} = \lambda H_{BA}^T$ for a complex scalar ($\lambda$).

In the case of a non-reciprocal channel, with analog and RF components, Non-reciprocal analog and RF components: $C_{TX,A}$, $C_{RX,A}$, $C_{RX,B}$, $C_{TX,B}$, ideally for simplicity, it is beneficial if each matrix is a diagonal matrix. Such an embodiment may also use a design that minimizes the coupling between Tx and Rx paths. Similarly, the composite channel from B to A is given by $\hat{H}_{B,A} = C_{RX,A} \cdot H_{B,A} \cdot C_{TX,B}$.

If all the C matrices can be estimated a priori, the BS to UE channel can be estimated from the UE to BS channel. In such a case, feeding back channel state information for transmit beamforming may not be needed, thereby making the upstream bandwidth available for data instead of having to transmit channel state information. Estimation of the C matrices may also improve system efficiency. In some embodiments disclosed herein, the reciprocity calibration may be performed by calibrating Tx and Rx of the BS and UE side during a startup or a pre-designated time. The diagonal matrices $C_{TX,A}$, $C_{RX,A}$, $C_{RX,B}$, $C_{TX,B}$ may be estimated. These matrices may be re-estimated and updated periodically. The rate of change of the C matrices will typically be slow and may be related to factors such as the operating temperature of the electronics used for Tx and Rx.

4.A. Notation

In the description herein, $h_{a1a2}$ denotes the channel from transmitter (TX) a1 to receiver (RX) a2. This notation is different from the conventional MIMO channel notation. In the conventional methods, this will be denoted as $h_{a2a1}$). Also, conjugate of a complex quantity is represented with a*, e.g., conj(h)=h*.

4.B. Downlink Channel Estimation from Uplink Channel and Calibration Coefficients While the disclosed techniques are more generally applicable, for the ease of explanation, the following assumptions are made:

[1] cross talk between the TX-TX, RX-RX and TX-RX RF chains is negligible
[2] Antenna mutual coupling in negligible
[3] TX and RX at BS are working with clocks generated from the same PLL so that carrier and symbol clocks are synchronized in wireless transmissions among transceivers at A or B (and not necessarily between A and B). Here, "A" and "B" represent communication devices at two ends of a communication medium. For example, A may refer to a base station (or user equipment) and correspondingly B may refer to a user equipment (or base station). As another example, A may refer to a hub and B may refer to a remote station. Without loss of generality, the channel from A to B may be called the downlink (DL) channel and the channel from B to A may be called the uplink (UL) channel. See, e.g., FIG. 13 and FIG. 14.
[4] same assumptions as above for UE.

Inventors' measurement on some existing equipment has verified that a) the coupling between different RF paths is typically of the order of –30 dB. A careful design of the RF front end can ensure even lesser levels of cross talk. b) The isolation between the cross polarizations of the antenna is of the order of 15 to 20 dB. This means that if a signal of x dB power is sent on the vertical polarization of a cross polarized antenna, an image with (x-15) dB power will appear on the horizontal polarization. This isolation cannot be improved much even under improved antenna design. So, for the below calibration mechanism to work properly, embodiments should either use i) antenna with single polarization is used or ii) if dual polarized antenna are used, take care that simultaneous transmission on both the polarizations is never happening.

However, these assumptions can be relaxed, as described herein, and modifications in the below described calibration algorithm will be presented as well. If dual polarized antenna is the design choice, modifications to the disclosed algorithm as described herein could be used in some embodiments.

Some embodiments of a calibration algorithm are described herein for a 4×4 MIMO system. This is to keep the description simple and easy to comprehend. The same mechanism can be generalized to systems with any number of BS and UE antenna.

Figures 13, 14:
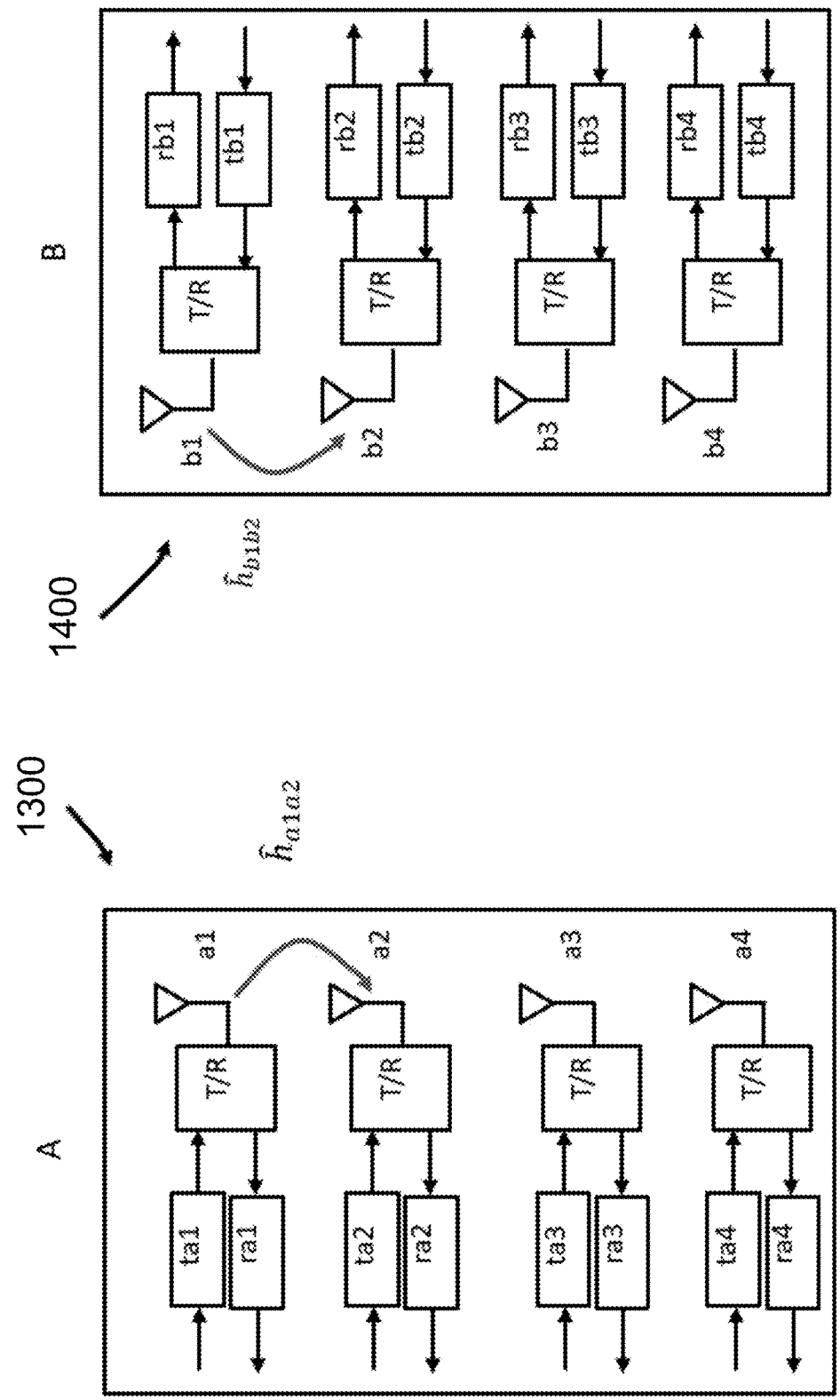
FIG. 13 shows an example antenna configuration in which four transmit and four receive antennas are used at a network-side apparatus.
FIG. 14 shows an example antenna configuration in a user-side communications apparatus.

With reference to FIG. 13 and FIG. 14, a four antenna system 1300 at A and a four antenna system 1400 at B are depicted, respectively. For example, the configuration 1300 at A may represent a base station and the configuration 1400 at B may represent a UE (or vice versa). Let $\hat{h}_{a1a2}$ denote the channel from TX a1 to RX a2. It is constituted by 2 components a). The reciprocal radio channel from antenna a1 to antenna a2 and b) the non-reciprocal components at TX a1 and RX a2. Non-reciprocal components are captured in two memory-less complex scalars denoted by $t_{a1}$ and $r_{a2}$ corresponding to the TX and RX respectively. In this patent document, modifications when delay is involved will be demonstrated as well.

Thus, $\hat{h}_{a1a2}$ can be written as:

$$\hat{h}_{a1a2} = t_{a1} \cdot h_{a1a2} \cdot r_{a2} \quad (31)$$

Similarly, channel between TX at a2 to RX at a1, $\hat{h}_{a2a1}$, can be written as $$\hat{h}_{a2a1} = t_{a2} \cdot h_{a2a1} \cdot r_{a1} \quad (32)$$

Taking the ratio between $\hat{h}a1a2$ and $\hat{h}a2a1$, and noting that ha1a2 and ha2a1 are identical, the following can be written:

$$c_{a1a2} = \frac{t_{a1} \cdot r_{a2}}{r_{a1} \cdot t_{a2}} \quad (33)$$
$$= \frac{1}{c_{a2a1}}.$$

The coefficient $c_{a1a2}$ is referred to as the calibration coefficient from a1 to a2. Similarly, the calibration coefficient from a2 to a3, $c_{a2a3}$, can be written as:

$$c_{a2a3} = \frac{t_{a2} \cdot r_{a3}}{r_{a2} \cdot t_{a3}} \quad (34)$$
$$= \frac{t_{a1} \cdot r_{a3}}{r_{a1} \cdot t_{a3}} \cdot \frac{r_{a1} \cdot t_{a2}}{t_{a1} \cdot r_{a2}}$$
$$= \frac{c_{a1a3}}{c_{a1a2}}$$

From Eq. (34), it can be seen that the calibration coefficient between antenna a2 (TX) and antenna a3 (RX) can be written as the ratio of the calibration coefficients of the reference antenna a1 to that of a3 and a2. Similar relations can be derived for TXs and RXs at B, depicted in configuration 1400 of FIG. 14. Equations for calibration coefficients that involve antennas from both sides A and B can be derived as below.

$$c_{a2b2} = \frac{t_{a2} \cdot r_{b2}}{t_{b2} \cdot r_{a2}} \quad (35)$$
$$= \frac{t_{a1} \cdot r_{b1}}{t_{b1} \cdot r_{a1}} \cdot \frac{r_{a1} \cdot t_{a2}}{t_{a1} \cdot r_{a2}} \cdot \frac{t_{b1} \cdot r_{b2}}{t_{b2} \cdot r_{b1}}$$
$$= \frac{c_{a1b1}}{c_{a1a2}} \cdot c_{b1b2}$$

From Eq. (35), it should be clear that any wireless channel between A and B can be written in terms of a) a calibration coefficient with respect to a reference antenna at A, b) a calibration coefficient with respect to a reference antenna at B, and c) a calibration coefficient between the same reference antennas at A and B.

Similarly, the downstream channels (BS-UE) can be represented in terms of the upstream channels (UE-BS) and calibration coefficients.

$$\hat{h}_{a1b1} = c_{a1b1} \cdot \hat{h}_{b1a1}$$

$$\hat{h}_{a1b2} = c_{a1b1} \cdot c_{b1b2} \cdot \hat{h}_{b2a1} (c_{a1b2} \cdot \hat{h}_{b2a1})$$

$$\hat{h}_{a1b3} = c_{a1b1} \cdot c_{b1b3} \cdot \hat{h}_{b3a1} (c_{a1b3} \cdot \hat{h}_{b3a1})$$

$$\hat{h}_{a1b4} = c_{a1b1} \cdot c_{b1b4} \cdot \hat{h}_{b4a1} \quad (36)$$

Similarly, $$\hat{h}_{a2b1} = \frac{c_{a1b1}}{c_{a1a2}} \cdot \hat{h}_{b1a2} \quad (37)$$

$$\hat{h}_{a2b2} = \frac{c_{a1b1}}{c_{a1a2}} \cdot c_{b1b2} \cdot \hat{h}_{b2a2}$$

$$\hat{h}_{a2b3} = \frac{c_{a1b1}}{c_{a1a2}} \cdot c_{b1b3} \cdot \hat{h}_{b3a2}$$

$$\hat{h}_{a2b4} = \frac{c_{a1b1}}{c_{a1a2}} \cdot c_{b1b4} \cdot \hat{h}_{b4a2}.$$

Furthermore, $$\hat{h}_{a3b1} = \frac{c_{a1b1}}{c_{a1a3}} \cdot \hat{h}_{b1a3} \quad (38)$$

$$\hat{h}_{a3b2} = \frac{c_{a1b1}}{c_{a1a3}} \cdot c_{b1b2} \cdot \hat{h}_{b2a3}$$

$$\hat{h}_{a3b3} = \frac{c_{a1b1}}{c_{a1a3}} \cdot c_{b1b3} \cdot \hat{h}_{b3a3}$$

$$\hat{h}_{a3b4} = \frac{c_{a1b1}}{c_{a1a3}} \cdot c_{b1b4} \cdot \hat{h}_{b4a3},$$

And finally $$\hat{h}_{a4b1} = \frac{c_{a1b1}}{c_{a1a4}} \cdot \hat{h}_{b1a4} \quad (39)$$

$$\hat{h}_{a4b2} = \frac{c_{a1b1}}{c_{a1a4}} \cdot c_{b1b2} \cdot \hat{h}_{b2a4}$$

$$\hat{h}_{a4b3} = \frac{c_{a1b1}}{c_{a1a4}} \cdot c_{b1b3} \cdot \hat{h}_{b3a4}$$

$$\hat{h}_{a4b4} = \frac{c_{a1b1}}{c_{a1a4}} \cdot c_{b1b4} \cdot \hat{h}_{b4a4}$$

Using the results from Eq. (36) to Eq. (39), and denoting $c_{a1b1}$ as $\xi$, a complex constant, the downlink MIMO channel can be expressed in terms of the uplink MIMO channel using the following equation:

(40a)

$$\begin{bmatrix} \hat{h}_{a1b1} & \hat{h}_{a2b1} & \hat{h}_{a3b1} & \hat{h}_{a4b1} \\ \hat{h}_{a1b2} & \hat{h}_{a2b2} & \hat{h}_{a3b2} & \hat{h}_{a4b2} \\ \hat{h}_{a1b3} & \hat{h}_{a2b3} & \hat{h}_{a3b3} & \hat{h}_{a4b3} \\ \hat{h}_{a1b4} & \hat{h}_{a2b4} & \hat{h}_{a3b4} & \hat{h}_{a4b4} \end{bmatrix} =$$

-continued $$\zeta \cdot \begin{bmatrix} \hat{h}_{b1a1} & \frac{1}{c_{a1a2}}\hat{h}_{b1a2} & \frac{1}{c_{a1a3}}\hat{h}_{b1a3} & \frac{1}{c_{a1a4}}\hat{h}_{b1a4} \\ c_{b1b2}\hat{h}_{b2a1} & \frac{c_{b1b2}}{c_{a1a2}}\hat{h}_{b2a2} & \frac{c_{b1b2}}{c_{a1a3}}\hat{h}_{b2a3} & \frac{c_{b1b2}}{c_{a1a4}}\hat{h}_{b2a4} \\ c_{b1b3}\hat{h}_{b3a1} & \frac{c_{b1b3}}{c_{a1a2}}\hat{h}_{b3a2} & \frac{c_{b1b3}}{c_{a1a3}}\hat{h}_{b3a3} & \frac{c_{b1b3}}{c_{a1a4}}\hat{h}_{b3a4} \\ c_{b1b4}\hat{h}_{b4a1} & \frac{c_{b1b4}}{c_{a1a2}}\hat{h}_{b4a2} & \frac{c_{b1b4}}{c_{a1a3}}\hat{h}_{b4a3} & \frac{c_{b1b4}}{c_{a1a4}}\hat{h}_{b4a4} \end{bmatrix}$$

The right hand side of Eq. (40a) can be further decomposed as:

$$= \zeta \cdot \begin{bmatrix} 1 & 0 & 0 & 0 \\ 0 & c_{b1b2} & 0 & 0 \\ 0 & 0 & c_{b1b3} & 0 \\ 0 & 0 & 0 & c_{b1b4} \end{bmatrix} \cdot \begin{bmatrix} \hat{h}_{b1a1} & \hat{h}_{b1a2} & \hat{h}_{b1a3} & \hat{h}_{b1a4} \\ \hat{h}_{b2a1} & \hat{h}_{b2a2} & \hat{h}_{b2a3} & \hat{h}_{b2a4} \\ \hat{h}_{b3a1} & \hat{h}_{b3a2} & \hat{h}_{b3a3} & \hat{h}_{b3a4} \\ \hat{h}_{b4a1} & \hat{h}_{b4a2} & \hat{h}_{b4a3} & \hat{h}_{b4a4} \end{bmatrix} \quad (40b)$$

$$\begin{bmatrix} 1 & 0 & 0 & 0 \\ 0 & \frac{1}{c_{a1a2}} & 0 & 0 \\ 0 & 0 & \frac{1}{c_{a1a3}} & 0 \\ 0 & 0 & 0 & \frac{1}{c_{a1a4}} \end{bmatrix}$$

Eq. (40b) is of the form $\xi \cdot K_B \cdot H_U \cdot K_A$. Elements in the calibration coefficient matrix $K_A$ and $K_B$ are obtained by calibrations performed at A (BS) and B (UE) and later by transferring UE coefficients to the BS. Note that calibration coefficient estimation at the BS may involve transmission and reception of calibration signals among BS antennas (a.k.a. local calibration). Similarly, estimation of calibration coefficients at UE can be performed using local transmission and reception of calibration signals among UE antennas.

In some embodiments, the TX and RX timing at a device (BS or UE) may be operated from the same PLL. This eliminates the carrier and/or clock offset impairments that is often associated with the detector at B for RF transmissions from A and vice versa. This is because A and B will be deriving all their internal clock frequencies, in general, from 2 different PLLs, one at A and another one at B. If these impairments are a part of the calibration coefficients, e.g., manifest themselves as a time varying phase rotation, then the coefficients will vary more frequently due to time varying carrier or clock errors in addition to its own time variability. Since $K_A$ and $K_B$ are obtained from measurements exclusively at BS or UE (and not using transmissions from BS to UE or vice versa), they vary relatively slowly.

Local calibrations, thus, are generally stable and do not change much over a period of several minutes (e.g., 30 minutes).

Eq. (40b) further reveals that the reverse MIMO channel can be mathematically modelled as the composition of a) a complex scalar, b) calibration coefficients at B, c) MIMO uplink channel transfer function, and d) calibration coefficients at A.

A pre-coder can be built at A (or at B), by acquiring calibration coefficients of the receiver side. The pre-coder implementation could be based on any of several pre-coders available in the literature. Some examples include: an MMSE pre-coder, a regularized MMSE precoder, a zero forcing precoder, a Tomlinson-Harashima pre-coder, and so on. As will be appreciated by one of skill in the art, either linear pre-coders (first three examples above) or non-linear pre-coders (the last example above) may be used.

Figure 15:
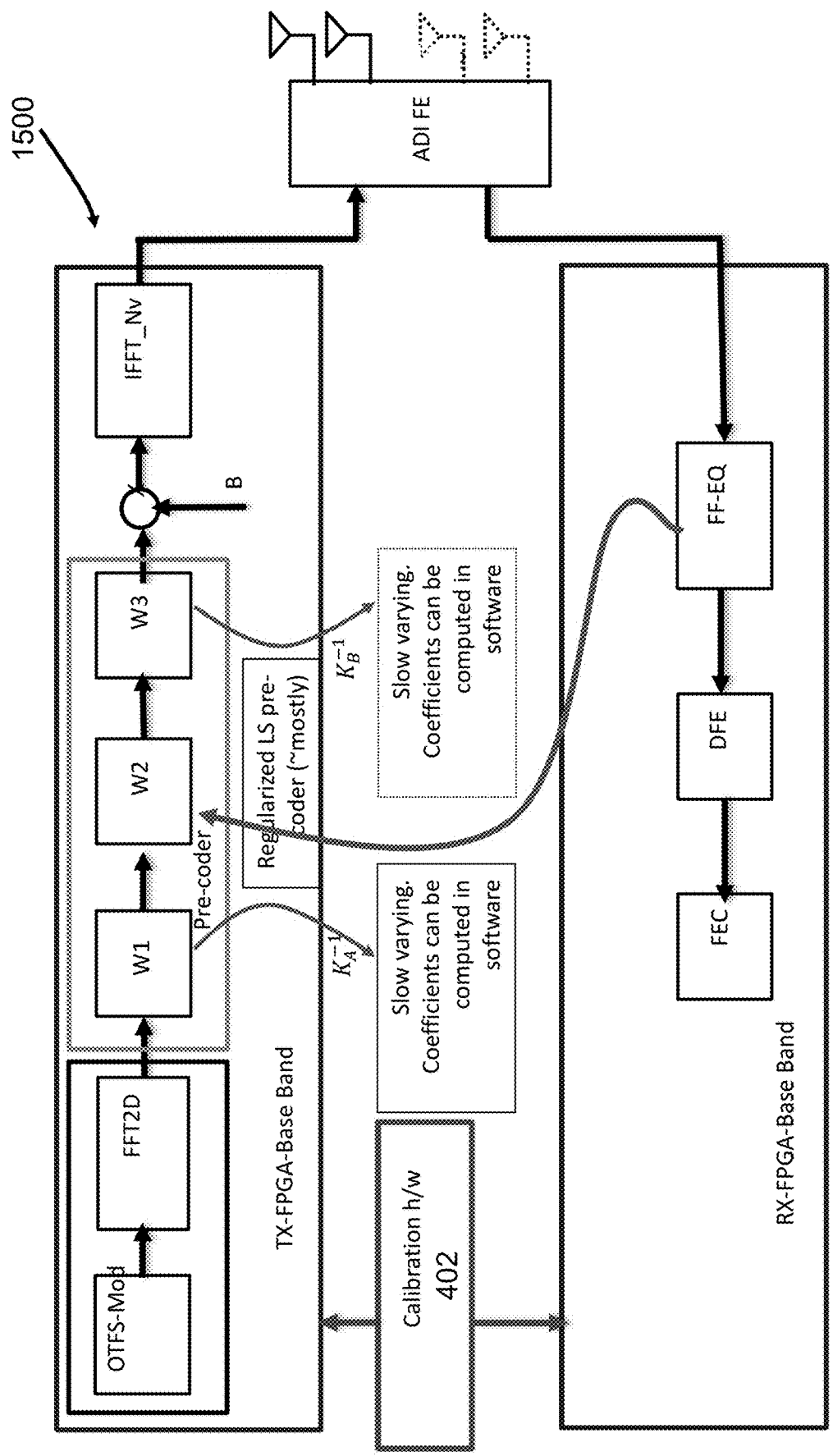
FIG. 15 shows a block diagram for an example implementation of reciprocity calculation.

To illustrate this point, an example embodiment of a reciprocity based zero-forcing (ZF) pre-coder using the data above (ref. Eq. 40b) is described below. The configuration of this pre-coder is depicted in FIG. 15. Note that, the same set of data can be used to design any type of pre-coder.

A ZF pre-coder may have the following form.

$$W = \frac{K_A^{-1} \cdot H_U^{-1} \cdot K_B^{-1}}{E\{\|K_A \cdot H_U \cdot B\|_F\}} \quad (40c)$$

Here, $\|\cdot\|F$ is the Frobenious norm of a given matrix. Note that the calibration coefficient between A and B does not appear in the pre-coder. The effect of will be counteracted by the equalizer (single tap or MIMO) at the UEs.

Some embodiments use the fact that $K_B$ and $K_A$ are typically slow-varying, so that their inverse can be implemented in software (instead of implementing in hardware). In some embodiments, W2 ($H_U^{-1}$) or inverse of $H_U$) may be fast varying and implemented in hardware circuits.

In some embodiments, W2 may be obtained as a by-product of the receiver Equalizer at the BS. For example BS equalizer often implements a variant of the $H_U^{-1}$.

Therefore, using the techniques disclosed herein, some embodiments may model the downlink channel as a composition of the uplink channel and slow varying local coefficients. This enables to build a variety of different pre-coders with minimal-feedback overhead, and certain linear precoders, use receiver equalizer computations performed at the base station.

Estimation of $\xi$ or $c_{a1b1}$ involves calibrating across BS and UE. For the reasons discussed above, these coefficients can be frequently varying and the estimation and feedback of these coefficients could consume a lot of bandwidth. Advantageously, a transmit-side pre-coder to cancel the multi-user interference can be designed without the knowledge of $\xi$. It can be designed from the upstream channel measurements $K_A$ and $K_B$, as described in the present document.

Several estimation methods to determine the calibration coefficients are described in the present document. When the number of antenna is relatively small, the method described in Section 4.0 may be used. When a large number of antennas are involved, the method described in Section 4.D may be used.

4.C. Estimation of Calibration Coefficients ($C_{x1x2}$)—Method 1—Iterative Algorithm When the number of antenna is relatively small, such as 4 as in this example, an iterative algorithm can be used to compute the calibration coefficients. This, however, will entail a large amount of calibrations in a massive MIMO scenario and may become impractical. In a massive MIMO scenario, estimation described in sec. III may be used.

Iteration 1:

$$c_{a1a3} = c_{a1a2} \cdot c_{a2a3} \quad (41)$$

$$c_{a1a4} = c_{a1a2} \cdot c_{a2a4} \quad (42)$$

Make an initial estimate of $C_{a1a2}$, $C_{a1a3}$, $c_{a1a4}$ as described herein. Also estimate $C_{a2a3}$ and $c_{a2a4}$. Using the latter, make an alternative estimate of $c_{a1a3}$ and $c_{a1a4}$ (eq. 41 and 42). From these two independent estimates of $c_{a1a3}$ and $c_{a1a4}$, make a refined estimate of $c_{a1a3}$ and $c_{a1a4}$ (e.g., the arithmetic mean). A refined estimate of $c_{a1a2}$ can be obtained from Eq. (41) or (42)

$$c_{a1a4}=c_{a1a3}\cdot c_{a3a4} \quad (43)$$

A refined estimate of $c_{a1a4}$ can be obtained (as described above), from a measurement of $c_{a3a4}$ using Eq. (43). Using the updated $c_{a1a4}$, estimates of $c_{a1a2}$ and $c_{a1a3}$ can be updated.

More iterations, in the above manner, can be performed to further refine the above coefficients.

The number of calibrations to be performed in this method is $4_{c2}=6$. Number of calibrations will grow exponentially in N, the number of antenna; hence not practical for large array of antenna.

4.D. Estimation of Calibration Coefficients ($C_{x1x2}$)—Method 2—Large Number of Antenna When the number of antenna is high, e.g., 64, Method 1 is not practically feasible. This section describes a simple method for the same.

The following equations have been previously seen derived.

$$\hat{h}_{a1a2}=C_{a1a2}\hat{h}_{a2a1} \quad (44)$$

$$y_{a2}=\hat{h}_{a1a2}s_{a1}+n_{a2} \quad (45)$$

$$y_{a1}=\hat{h}_{a2a1}s_{a2}+n_{a1} \quad (46)$$

where sa1, sa2 are known training symbols, $y_{a1}$ and $y_{a2}$ are the received signal and n is additive noise. It is assumed that the noise is white in the frequency band of interest. The LS estimates of $$\hat{h}_{a1a2} = \frac{y_{a2}\cdot s_{a1}^*}{|s_{a1}|^2} \text{ and } \hat{h}_{a2a1} = \frac{y_{a1}\cdot s_{a2}^*}{|s_{a2}|^2}.$$

Note that the estimation error is $$CN\left(0, \frac{\sigma_n^2}{|s_b|^2}\right).$$

Now $$C_{a1a2} = \frac{\hat{h}_{a1a2}}{\hat{h}_{a2a1}}.$$

Similar expressions hold good for other calibration coefficients.

For a 64 antenna system, this method would use a total of 64 calibration signal transmissions.

4.E. Estimation of Calibration Coefficients ($C_{x1x2}$)—Method 3—Using Total Least Squares (TLS)

What is described below is an algorithm to estimate the calibration coefficients using the method of total least squares.

Refer to Method 2. Take k (say 4) such LS estimates and form the following matrix $$H_{a1a2}=[\hat{h}_{a1a2,1},\hat{h}_{a1a2,2}\cdots \hat{h}_{a1a2,4}] \quad (47)$$

$$H_{a2a1}=[\hat{h}_{a2a1,1},\hat{h}_{a2a1,2}\cdots \hat{h}_{a2a1,4}] \quad (48)$$

Let D=[$H_{a2a1}$, $H_{a1a2}$]. Note that D is a 4×2 matrix in this example.

$$\hat{c}_{a1a2} = \underset{\Delta H_{a1a2}, \Delta H_{a2a1}}{\operatorname{argmin}} |\Delta H_{a2a1}|_F^2 + |\Delta H_{a1a2}|_F^2$$

subject to $$H_{a1a2}+\Delta H_{a1a2}=(H_{a2a1}+\Delta H_{a2a1})\cdot c_{a1a2}$$

Solution for the above is obtained as below,

Let D=U$\Sigma$V$^H$ where $\Sigma$=diag($\sigma_1, \sigma_2$), $\sigma_1 > \sigma_2$, where $\sigma$s are singular values of D; U and V are the left and right eigen-vectors respectively. Let $$V = \begin{bmatrix} v_{11} & v_{12} \\ v_{21} & v_{22} \end{bmatrix}. \quad (49)$$

To have a solution for this Total Least Squares problem, $v_{22}\neq 0$. Only if $\sigma_1\neq\sigma_2$, the solution will be unique.

The solution is given by, $$\hat{c}_{a1a2\text{-}opt} = \frac{-v_{12}}{v_{22}}.$$

In some embodiments, total least squares error optimization criteria may be used.

Total least squares assumes that both h·(..) and c·(..) are subject to estimation errors. This is more realistic compared to assuming that h (..) is impervious to estimation errors.

Note that three different methods for estimating the calibration coefficients are described above. During the implementation/prototyping phase, effectiveness of each method can be evaluated separately and the one with the best merit need to be selected for the final implementation. Alternatively, the decision may be made based on the number of antennas for which the calibration is performed. For example, method 1 may be suitable for up to 8 receive and/or transmit antennas, while methods 2 or 3 may be used for higher number of antennas.

4.F. Effect of Delays in the TX/RX Path

Let delays associated with $t_{a1}$, $t_{a2}$, $r_{a1}$ and $r_{a2}$ be $\tau_{ta1}$, $\tau_{ta2}$, $\tau_{ra1}$, $\tau_{ra2}$. Therefore, $$c_{a1a2} = \frac{|t_{a1}\cdot r_{a2}|}{|r_{a1}\cdot t_{a2}|} \cdot \frac{e^{-j2\pi f\tau_{ra2}}\cdot e^{-j2\pi f\tau_{ta1}}}{e^{-j2\pi f\tau_{ra1}}\cdot e^{-j2\pi f\tau_{ta2}}} \quad (50)$$

$$= |c_{a1a2}|\cdot e^{-j2\pi f\delta\tau}$$

where $\delta\tau=(\tau_{ta1}+\tau_{ra2})-(\tau_{ta2}-\tau_{ra1})$, the delay difference between the $a_1$ and $a_2$. It is clear that, the effect of $\delta\tau$ is to cause a linear phase on the calibration coefficients across the frequency.

Calibration coefficient as can be seen is a function of $\delta\tau$. The delays in the digital sections of TX and RX will not affect the calibration coefficients, as these will cancel out in the expression above (Note that digital delays are identical for all transmitters. This is true for receivers as well). It is clear that, a delay effect, as described above, will be manifested if the synchronizing clocks at BS or UE are routed using long traces.

It has been assumed that $t_{a1}$ etc. is memory-less. The case were $t_{a1}$ for example is say a 2 tap filter is not considered in this formulation.

4.G. Calibration Coefficients when there is Mutual Coupling Between TX/TX, TX/RX Paths Non-negligible coupling between different TX/RX path can exist due to a) Imperfect hardware design or more importantly b) if cross-polarized antenna is used in the design. Modifications to the calibration algorithm under these conditions is described below. It is assumed that there is no coupling between the TX and RX paths.

Referring to FIG. 13 and FIG. 14, assume that the receive paths have mutual coupling between them. For e.g., $r_{a1a2}$ is the mutual coupling between receive paths $r_1$ and $r_2$. Similarly $r_{a1a3}$ refers to the coupling between the receive paths $r_1$ and $r_3$. Similar explanation applies to mutual coupling between the transmit paths. Note that $r_{a1a1}$ refers to $r_{a1}$ of the Section 4.B.

Assume that antenna a1 transmits a calibration sequence, s$a1$. It has been received by receive antenna $a_2$, $a_3$ and $a_4$. Similar to the formulation in Sections 4.B. and 4.C., the following expressions can be derived.

$$\begin{bmatrix} y'_{a2} \\ y'_{a3} \\ y'_{a4} \end{bmatrix} = \begin{bmatrix} r_{a2a2} & r_{a2a3} & r_{a2a4} \\ r_{a3a2} & r_{a3a3} & r_{a3a4} \\ r_{a4a2} & r_{a4a3} & r_{a4a4} \end{bmatrix} \begin{bmatrix} h_{a1a2} \\ h_{a1a3} \\ h_{a1a4} \end{bmatrix} t_{a1} \cdot s_{a1} + \begin{bmatrix} n_{a2} \\ n_{a3} \\ n_{a4} \end{bmatrix} \quad (51)$$

$$\begin{bmatrix} y''_{a1} \\ y''_{a3} \\ y''_{a4} \end{bmatrix} = \begin{bmatrix} r_{a1a1} & r_{a1a3} & r_{a1a4} \\ r_{a3a1} & r_{a3a3} & r_{a3a4} \\ r_{a4a1} & r_{a4a3} & r_{a4a4} \end{bmatrix} \begin{bmatrix} h_{a2a1} \\ h_{a2a3} \\ h_{a2a4} \end{bmatrix} t_{a2} \cdot s_{a2} + \begin{bmatrix} n_{a1} \\ n_{a3} \\ n_{a4} \end{bmatrix} \quad (52)$$

$$\begin{bmatrix} y'''_{a1} \\ y'''_{a2} \\ y'''_{a4} \end{bmatrix} = \begin{bmatrix} r_{a1a1} & r_{a1a2} & r_{a1a4} \\ r_{a2a1} & r_{a2a2} & r_{a2a4} \\ r_{a4a1} & r_{a4a2} & r_{a4a4} \end{bmatrix} \begin{bmatrix} h_{a3a1} \\ h_{a3a2} \\ h_{a3a4} \end{bmatrix} t_{a3} \cdot s_{a3} + \begin{bmatrix} n_{a1} \\ n_{a2} \\ n_{a4} \end{bmatrix} \quad (53)$$

$$\begin{bmatrix} y''''_{a1} \\ y''''_{a2} \\ y''''_{a3} \end{bmatrix} = \begin{bmatrix} r_{a1a1} & r_{a1a2} & r_{a1a3} \\ r_{a2a1} & r_{a2a2} & r_{a2a3} \\ r_{a3a1} & r_{a3a2} & r_{a3a3} \end{bmatrix} \begin{bmatrix} h_{a4a1} \\ h_{a4a2} \\ h_{a4a3} \end{bmatrix} t_{a4} \cdot s_{a4} + \begin{bmatrix} n_{a1} \\ n_{a2} \\ n_{a3} \end{bmatrix} \quad (54)$$

Proceeding as in Section 4.D., LS estimates of $\hat{h}_{a1a2}$, $\hat{h}_{a1a3}$ and $\hat{h}_{a1a4}$ can be obtained from Eq. (51). The term $h_{a1a2}$ is the non-reciprocal (baseband) channel from antenna a1 to antenna a2, whereas $h_{a1a2}$ is the reciprocal radio channel from antenna a1 to antenna a2g. Similarly, LS estimates $\hat{h}_{a2a1}/\!\!\wedge$, $\hat{h}_{a3a1}/\!\!\wedge$ and $\hat{h}_{a4a1}/\!\!\wedge$ can be obtained from equations 52, 53 and 54.

$$\begin{bmatrix} \hat{h}_{a1a2} \\ \hat{h}_{a1a3} \\ \hat{h}_{a1a4} \end{bmatrix} = t_{a1} \cdot \begin{bmatrix} r_{a2a2} & r_{a2a3} & r_{a2a4} \\ r_{a3a2} & r_{a3a3} & r_{a3a4} \\ r_{a4a2} & r_{a4a3} & r_{a4a4} \end{bmatrix} \begin{bmatrix} h_{a1a2} \\ h_{a1a3} \\ h_{a1a4} \end{bmatrix} \quad (55)$$

$$\begin{bmatrix} \hat{h}_{a2a1} \\ \hat{h}_{a3a1} \\ \hat{h}_{a4a1} \end{bmatrix} = \begin{bmatrix} r_{a1a1} \cdot t_{a2} & r_{a1a3} \cdot t_{a2} & r_{a1a4} \cdot t_{a2} \\ r_{a1a1} \cdot t_{a4} & r_{a1a2} \cdot t_{a3} & r_{a1a4} \cdot t_{a3} \\ r_{a1a1} \cdot t_{a4} & r_{a1a2} \cdot t_{a4} & r_{a1a3} \cdot t_{a4} \end{bmatrix} \begin{bmatrix} h_{a2a1} \\ h_{a3a1} \\ h_{a4a1} \end{bmatrix} \quad (56)$$

From Eq. 55 and 56, we can write the following $$\begin{bmatrix} \hat{h}_{a2a1} \\ \hat{h}_{a3a1} \\ \hat{h}_{a4a1} \end{bmatrix} = \quad (57)$$

$$\frac{1}{t_{a1}} \cdot \underbrace{\begin{bmatrix} r_{a1a1} \cdot t_{a2} & r_{a1a3} \cdot t_{a2} & r_{a1a4} \cdot t_{a2} \\ r_{a1a1} \cdot t_{a3} & r_{a1a2} \cdot t_{a3} & r_{a1a4} \cdot t_{a3} \\ r_{a1a1} \cdot t_{a4} & r_{a1a2} \cdot t_{a4} & r_{a1a3} \cdot t_{a4} \end{bmatrix} \begin{bmatrix} r_{a2a2} & r_{a2a3} & r_{a2a4} \\ r_{a3a2} & r_{a3a3} & r_{a3a4} \\ r_{a4a2} & r_{a4a3} & r_{a4a4} \end{bmatrix}^{-1}}_{C} \begin{bmatrix} \hat{h}_{a1a2} \\ \hat{h}_{a1a3} \\ \hat{h}_{a1a4} \end{bmatrix}$$

where C is the calibration coefficient to be estimated. It is interesting to note that when the mutual coupling coefficients are set to 0, the above equation gives raise to eq. 33. Similarly $\hat{h}_{a2a3}$ $\hat{h}_{a2a4}$ and $\hat{h}_{a3a4}$ can be expressed in terms of the product of a calibration matrix and $\hat{h}_{a3a2}$, $\hat{h}_{a4a2}$ and $\hat{h}_{a4a3}$.

These calibration coefficients can be computed using Total Least Squares method (method 3).

Note that there is no mutual coupling between sides A and B. This enables embodiments to write downstream link exactly as in Eq. 40c. However, in this case, $K_A$ and $K_B$ will no longer be diagonal matrices.

5. Embodiments and Method for the Disclosed Technology

Figure 16:
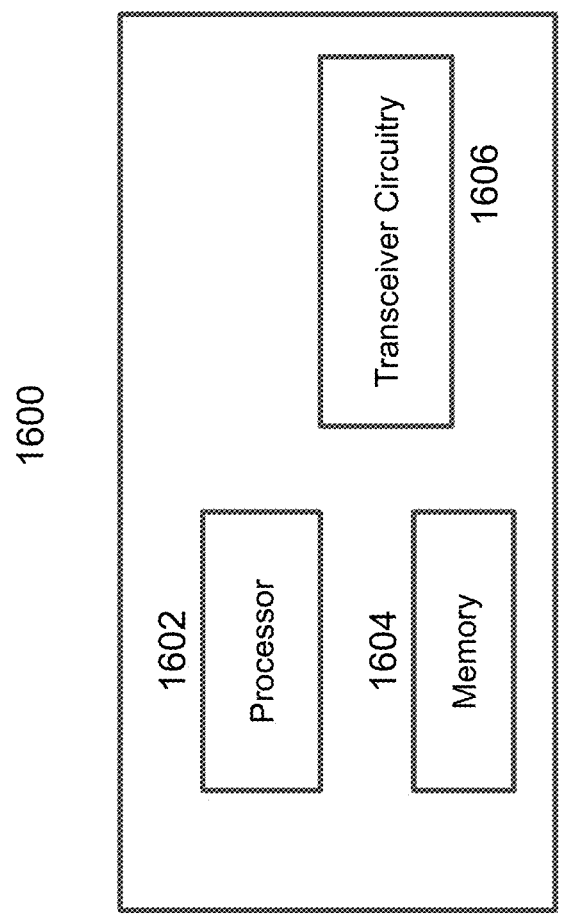
FIG. 16 shows an example of a wireless transceiver apparatus.

FIG. 16 is a block diagram representation of a wireless hardware platform 1600 which may be used to implement the various methods described in the present document. The hardware platform 1600 may be incorporated within a base station or a user device. The hardware platform 1600 includes a processor 1602, a memory 1604 and a transceiver circuitry 1606. The processor 1602 may execute instructions, e. g., by reading from the memory 1604, and control the operation of the transceiver circuitry 1606 and the hardware platform 1600 to perform the methods described herein. In some embodiments, the memory, processor and transceiver may be included in a single chip solution.

Figure 17:
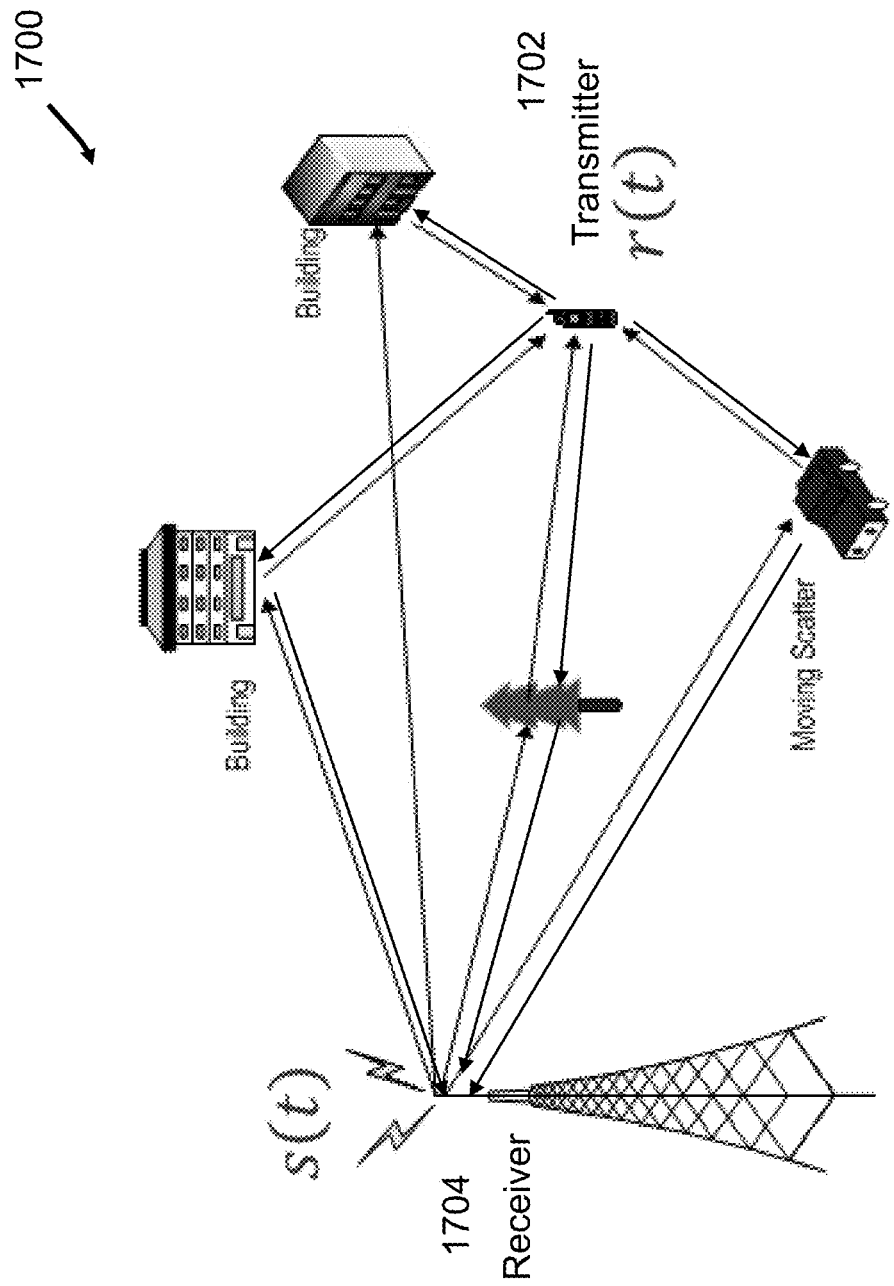
FIG. 17 shows an example communication network.

FIG. 17 shows an example of a wireless communication system 1700 in which a transmitter device 1702 transmits signals to a receiver 1704. The signals may undergo various wireless channels and multipaths, as depicted. Some reflectors such as buildings and trees may be static, while others such as cars, may be moving scatterers. The transmitter device 1702 may be, for example, a mobile phone, a tablet, a computer, or another Internet of Things (IoT) device such as a smartwatch, a camera, and so on. The receiver device 1704 may be a network device such as the base station. The signals transmitted from the base station to the transmitter 1702 may experience similar channel degradations produced by static or moving scatterers. The techniques described in the present document may be implemented by the devices in the wireless communication system 1700.

Figure 18:
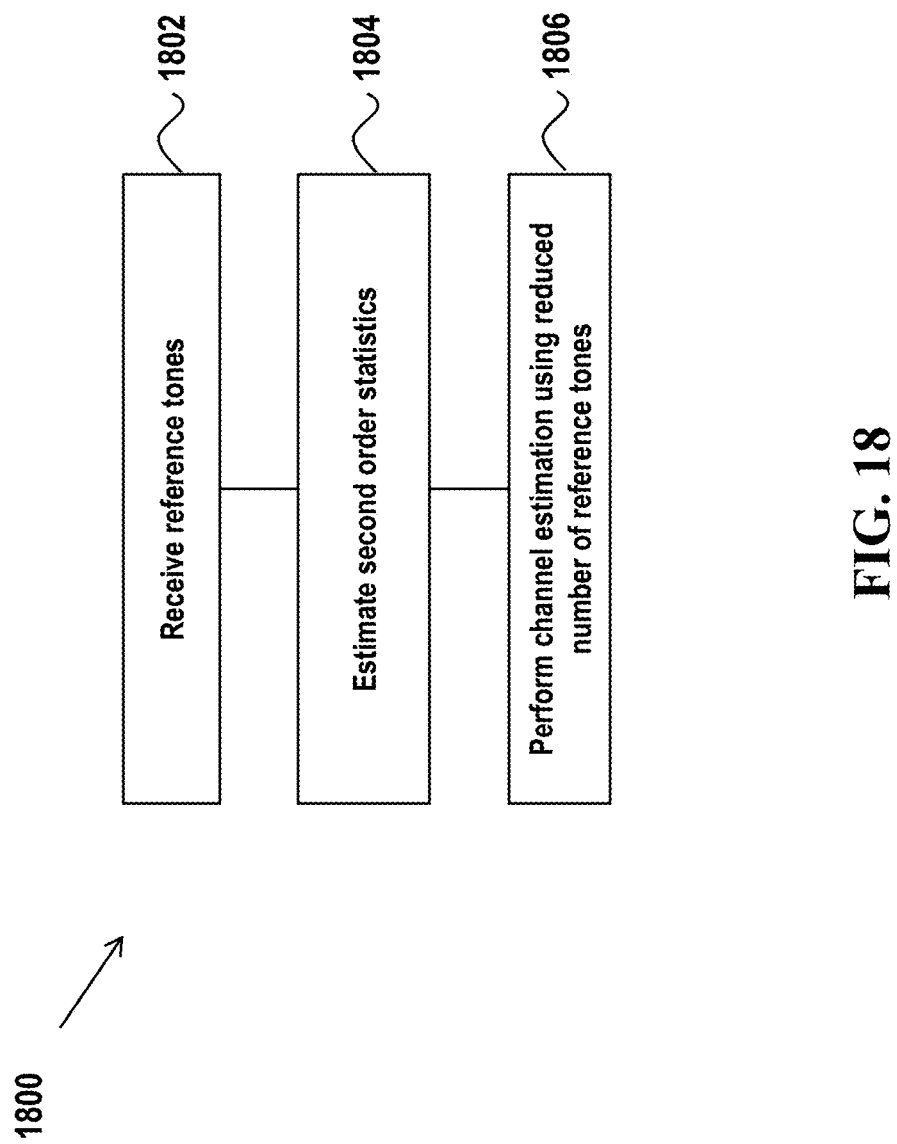
FIG. 18 is a flowchart for an example wireless communication method.

FIG. 18 is a flowchart for an example method 1800 for wireless communication. The method 1800 may be implemented by a base station in a wireless network. The method 1800 includes receiving (1802), by a first wireless device (e.g., the base station) during a training phase, reference tones using a first number of resource elements from a transmitter of a second wireless device, wherein the first wireless device comprises multiple receiving antennas, estimating (1804), by the first wireless device, from the receiving the reference tones, a second order statistics of wireless channels between the multiple receiving antennas and the transmitter of the second wireless device, and performing (1806) channel estimation, during an operational phase subsequent to the training phase, using the second order statistics and reference tones received on a second number of resource elements, wherein the second number is less than the first number.

As previously described, the training phase may be based on a pre-defined number of repetitions of the reference signal transmission, or may be dependent on passage of a time, such as 10 to 20 seconds, during which the training is performed. The estimation operation 1804 may be performed by solving for the various equations described herein.

Upon the base station deciding that the training phase is over, then the base station may begin operating in the operational phase. The transition from the training phase to the operational phase may be communicated to user devices via an over-the-air message transmission. Alternative, the user devices and the base station may keep track of number of reference signal transmissions performed, and enter operational phase after a pre-defined threshold is exceeded.

As described herein, during operational phase, a reduced number of resource elements may be used for reference signal transmissions. In some embodiments, this number may be selected to be a fixed number that is known to both the transmitter and the receiver. In general, this number is less (or far less) than the first number of reference tones used during the training phase. As previously discussed, preferably sufficient reference tones are transmitted and received so that the essential parameters of the channel can be extracted.

The second order statistics may be measured in one of two different techniques as described here. In one technique, called the averaging method, the channel matrix is formulated as an average of autocovariance of an estimated channel response over all the receiving antennas of the first wireless device, at different time instances. In another technique, called, the direct method, includes estimating covariance of a channel matrix using a direct method in which the channel matrix is formulated to comprise a number of columns, wherein each column comprises an estimated channel response over all the receiving antennas of the first wireless device at a time instance. Further details are described with reference to equations (1) to (3).

During the operational phase, the method 700 may include performing channel estimation using an interpolation filter that interpolates from a decimated version of the channel estimate onto the entire channel estimate. Some example embodiments are provided with respect to Equations (5) to (9).

The method 1800 may further include estimating an error covariance matrix representative of an error in the estimated channel response over all of the receiving antennas computed by interpolating channel estimates; and selectively revising, for future use, the second number of resource elements of reference tones using a measure of the error covariance matrix. The measure of error covariance may be the comparison between a sum of squares of diagonal entries with a threshold, as described with respect to Equation (10) and (11).

Figure 19:
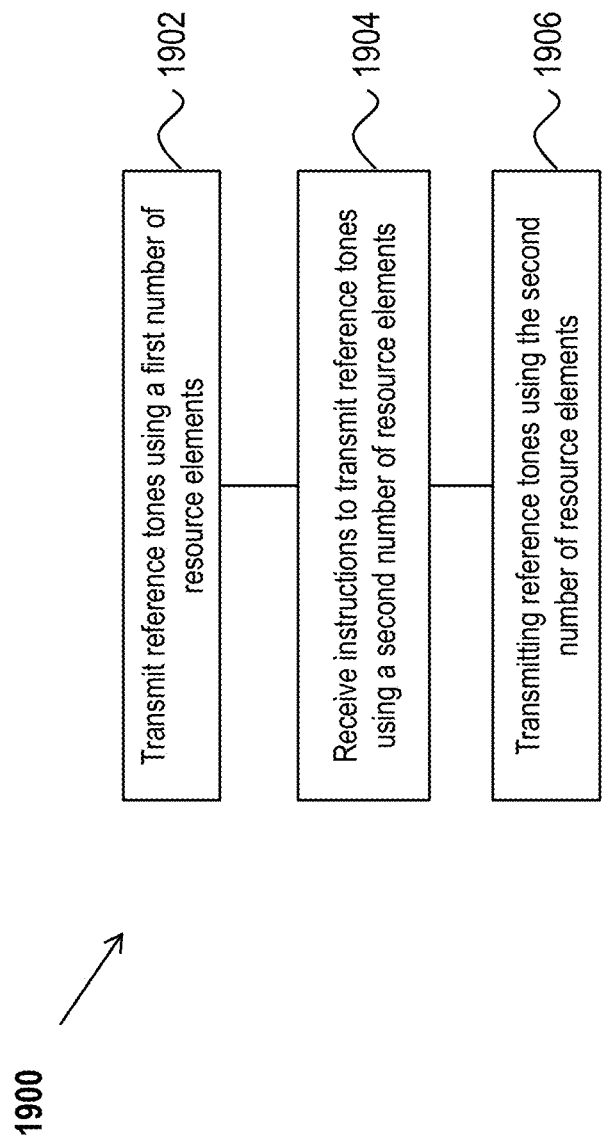
FIG. 19 is a flowchart for another example wireless communication method.

FIG. 19 is a flowchart for an example method 1900 of wireless communication. The method 1900 may be implemented by a user device (user equipment) in a wireless system. The method includes transmitting (1902), to multiple receive antennas of a first wireless device from a transmit antenna of a second wireless device, during a training phase, reference tones using a first number of resource elements of a wireless channel between the transmit antenna and the multiple receive antennas, receiving (1904), at an end of the training phase, an instruction to transmit reference tones using a second number of resource elements, and transmitting (1906), during an operational phase after the training phase, reference tones to the multiple receive antennas of the first wireless device using the second number of resource elements, wherein the second number is different from the first number and wherein the second number is based on an estimated second order statistics of the wireless channel.

In some embodiments, the method 1900 further includes receiving, during the operational phase, another instruction to transmit reference tones using a third number of resource elements, wherein the third number is different from the first number and the second number, and transmitting, after receiving the another instruction, reference tones to the first wireless device using the third number of resource elements. For example, the base station may decide that the reduced number of reference tones may have to be adjusted upwards (if seeing too many errors, see equations (9) and (10)) or adjusted lower when the number of reflectors in the channel is less than what was observed in the training phase. As previously described, the lower number of reference signal overhead can improve the efficiency of a wireless channel by making greater bandwidth for data traffic.

Figure 20:
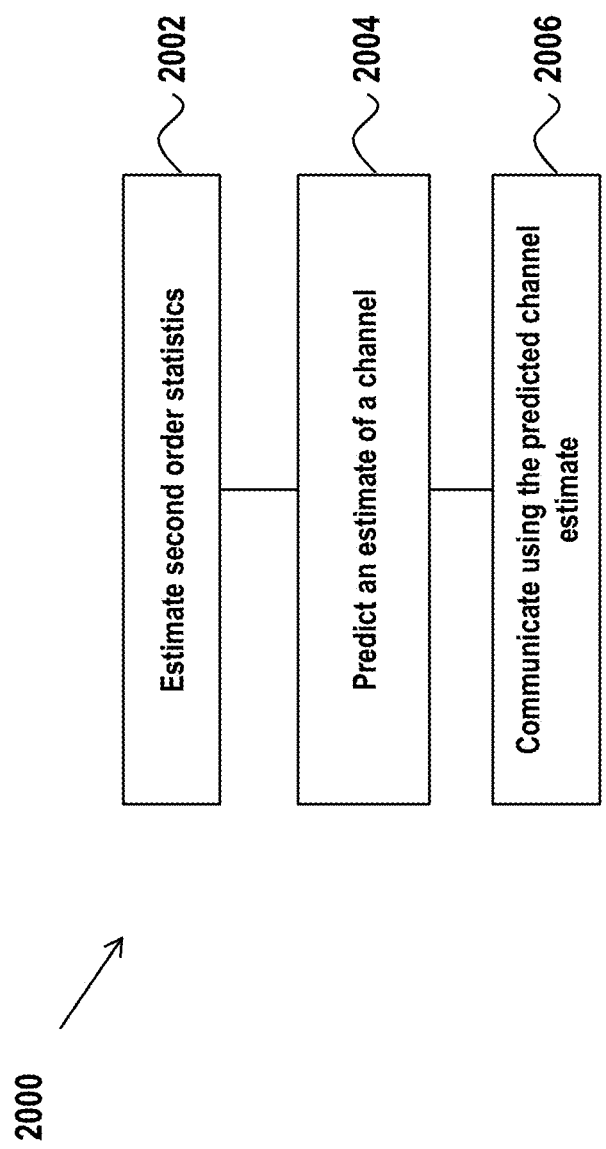
FIG. 20 is a flowchart for another example wireless communication method.

FIG. 20 discloses another method 2000 of wireless communication. The method 2000 includes estimating (2002), during a training phase, a second order statistics for a first wireless channel and a second wireless channel between a transmitter and a receiver comprising multiple antennas, wherein the second order statistics is estimated using reference tones transmitted on a first number of resource elements, predicting (2004), during an operational phase subsequent to the training phase, an estimate of the second wireless channel based on the second order statistics and an estimate of the first wireless channel calculated using reference tones transmitted on a second number of resource elements, where the second number is less than the first number, and communicating (2006), during the operational phase, over the second wireless channel using the estimate of the second wireless channel resulting from the predicting, wherein the first wireless channel and the second wireless channel include non-overlapping frequencies.

In some embodiments, the second order statistics may include a cross-covariance between an estimate of the first wireless channel and an estimate of the second wireless channel. The estimates of the first and second wireless channels may be obtained during different time periods (e.g., training phases that are offset in time with respect to each other). Sections 2 and 3 have provided additional details used by the method 2000.

In the methods 1800, 1900 and 2000, the resource elements may represent time slots or subcarriers. The reference tone transmission during the training phase may occur on non-contiguous frequencies.

It will be appreciated that technique for reducing the amount of transmission resources used for reference signal transmissions are disclosed. Using the disclosed techniques, e.g., determination of second order statistics, calculation of an interpolation filter, and interpolating based on the interpolation filter, can be used to reduce the number of pilot transmissions after an initial training phase in which an estimate of the channel and its second order statistics are obtained. The reduced number of transmissions is sufficient as long as these transmissions provide sufficient information via diversity in angle of arrival, number of transmissions and resources used for transmissions such that the receiver is able to discern the wireless channel characteristics, e.g., dominant reflectors in the channel. This reduced set of number may be fixed a priori (e.g., based on a general knowledge of the expected channel under which the wireless communication is to operate) or may be changed from time to time based on the disclosed error measurements. As an illustrative example, if a wireless channel is characterized by 8 dominant reflectors, it may be sufficient to send a single reference tone to 8 receive antennas of a base station from a transmit antenna (e.g., a user device) to estimate and predict the entire channel both in the uplink and in the downlink directions, and at future transmission times.

Figure 21:
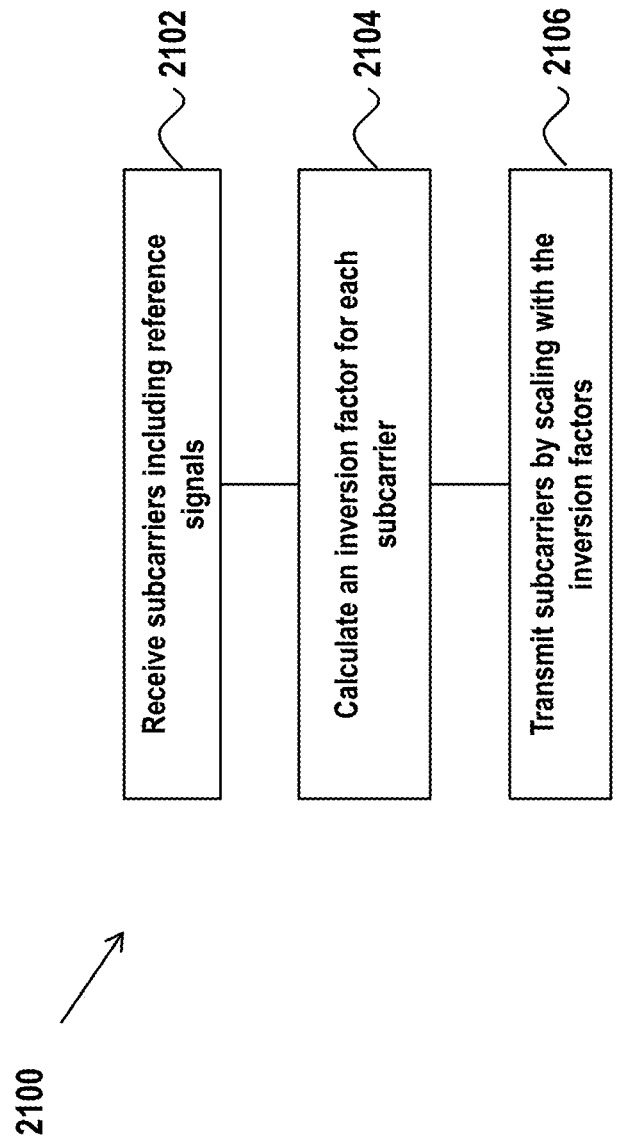
FIG. 21 is a flowchart for another example wireless communication method.

FIG. 21 is a flowchart for an example method 600 of wireless communication. At 2102, a first communication device receives a number of subcarriers from a second communication device. Each subcarrier includes a corresponding reference signal. For example, the first communication device may be Terminal B in FIG. 3B. In some embodiments, the first communication device may be a user equipment (UE) or a wireless terminal that is incorporated into a phone, camera, laptop, tablet, Internet of Things (IoT) device or another device capable of received and transmitting wireless signals. In some embodiments, the second communication device may be the above-discussed Terminal A. In some embodiments, the second communication device may be a base station, an access point, Hub 102 (in FIG. 1), macro tower 202 (in FIG. 2), or another network-side device that is providing communication connectivity to multiple devices such as the first communication device.

In some embodiments, the receiving operation 2102 may occur in a single time slot of a TDD communication system. Alternatively, the reference signal transmissions over the subcarriers may be received over multiple time slots. Similarly, in some implementations, multiple reference signal transmissions on a same subcarrier may be received over multiple timeslots and the results may be averaged to reduce effect of noise on the various calculations described herein.

At 2102, the first communication device may calculate an inversion factor for each subcarrier based on the received value of the reference signal received on respective subcarrier. As described in the present document, e.g., equation (28), a zero forcing technique to ensure numerical stability of the calculation may be used. The regularized zero forcing technique, for example, eliminates singularity caused by zero or low valued denominator of Equation (28).

At 2106, the first communication device may transmit pilot signals back to the second communication device. The pilot signals are scaled by the inversion factor calculated for the subcarrier on which the pilot is being transmitted.

As described in the present document, one of the advantageous aspect of the method 2100 is that each inversion factor is a scalar. Inversion factors may be rational numbers or, in general, complex numbers representing both a scale and a phase shift for the subcarrier.

In some embodiments, the pilot signal and the reference signals may both be unit signals. For example, the pilot and reference signals may simply multiply a pre-determined subcarrier level by a factor of 1. Alternatively, other scaling factors may be used. Similarly, the reference signal may also simply multiply a nominal subcarrier level by a scale factor of 1. Other scale factors may be used for multiplying a nominal subcarrier value both to the first communication device, and from the subcarrier device. These scale factors may, for example, be selected such that the product of "to" and "from" scale factors for nominal subcarrier signal level scaling is 1.

As previously described, averaging may be performed by the first communication device, by repeating inversion factor calculations for subcarriers over multiple receptions.

Figure 22:
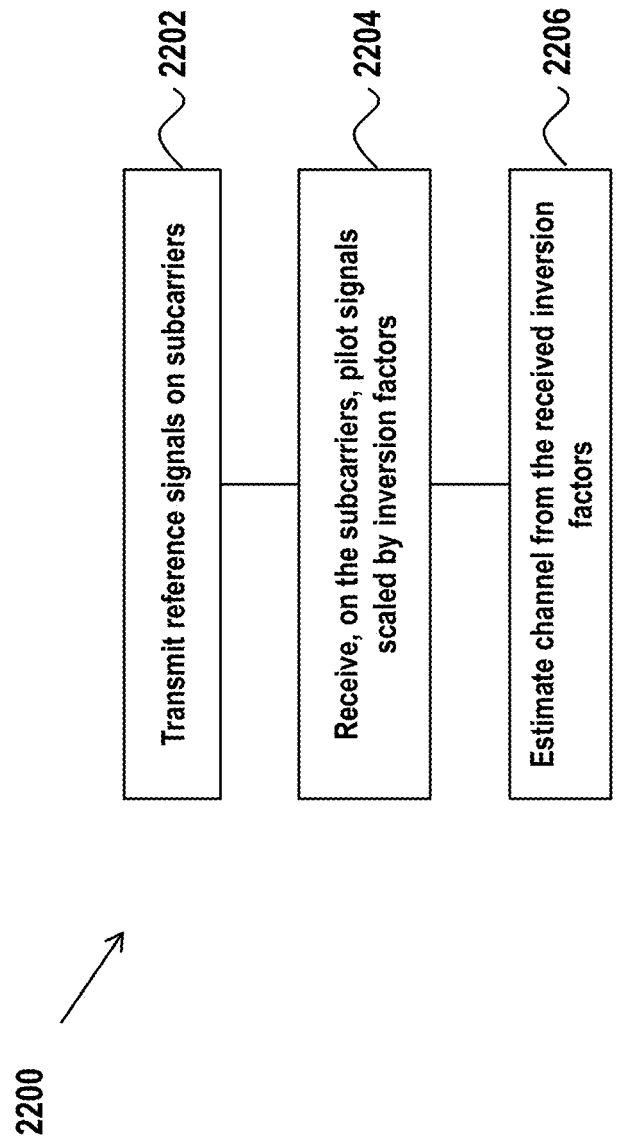
FIG. 22 is a flowchart for another example wireless communication method.

FIG. 22 is a flowchart of an example method 2200 of wireless communication. The method 2200 may transmit reference signals and precoded signals to a first communication device from a second communication device. The first and the second communication devices may be embodied, for example, as described with respect to method 2100.

At 2202, the second communication device transmits reference signals using a number of subcarriers. The reference signals may simply scale by unity a nominal signal level of the subcarrier. Other scale factors may be used, as described with respect to method 2100. The reference signal transmissions may be performed in a single time slot. Alternatively, multiple reference signal transmissions may be performed over multiple time slots. The reference signal transmissions may be repeated as often as needed, e.g., based on the effectiveness of the subsequent pre-coding to achieve or maintain low error communication.

At 2204, the second communication device receives inversion factors in the form or scaled pilot signals from the first communication device, where the subcarriers that were used for reference signal transmissions are scaled by the corresponding inversion factor calculated by the first communication device.

At 2206, the second communication device may estimate the communication channel from the second communication device to the first communication device by generating values on all the subcarriers based on the inversion factors that were received on the subset of the subcarriers. For example, simple linear interpolation may be used for reduced computational complexity.

After an estimate of the communication channel based on the inversion factors is obtained, the second communication device may then computer a full channel response that also includes channel response of the reflectors. In some embodiments, second order statistics of the effect of the reflectors may be used for obtaining the full channel response.

In some embodiments, the first communication device is Terminal B described in the present document and depicted in FIG. 3B. Typically, multiple Terminal Bs may be present in a wireless communication system, with a single Terminal A, and possibly a secondary base station, will provide wireless access to multiple Terminal B's. In some embodiments, the second communication device is Terminal A described in the present document and depicted in FIG. 3B. With respect to the methods 600 and 700, the sparse set of subcarriers over which the reference signals (and subsequently pilot signals) may be transmitted may include every Mth subcarrier, such as every 8th or every 16th subcarrier. In some embodiments, a non-uniform group of subcarriers may be used.

In some embodiments, a wireless communication device (e.g., 1600) may include a processor and a transceiver circuitry such that the processor controls the operation of inversion factor calculations and the transceiver circuitry is used to transmit or receive the reference signals and the pilot signals.

It will be appreciated by one of skill in the art that the described receiver-side inversion is a novel approach for computing reciprocity calibration factors that has low feed-back overhead and more favorable dynamic range requirements compared to existing solutions. For a given tone in the frequency domain, only one symbol transmission in each direction is required to obtain the reciprocity calibration factor, which greatly reduces overhead compared to feeding back channels as data samples. As such, it is well suited to enabling efficient bidirectional transmission in TDD wireless systems operating with a large number of both BS antennas and CPEs.

The following listing of examples provide embodiments that can addressed the technical problems described in the present document, among other problems.

1. A wireless communication method, comprising: receiving, by a first wireless device during a training phase, reference tones using a first number of resource elements from a transmitter of a second wireless device, wherein the first wireless device comprises multiple receiving antennas; estimating, by the first wireless device, from the receiving the reference tones, a second order statistics of wireless channels between the multiple receiving antennas and the transmitter of the second wireless device; and performing channel estimation, during an operational phase subsequent to the training phase, using the second order statistics and reference tones received on a second number of resource elements, wherein the second number is less than the first number.

2. The method of example 1, wherein the estimating the second order statistics includes estimating covariance of a channel matrix using a direct method in which the channel matrix is formulated to comprise a number of columns, wherein each column comprises an estimated channel response over all the receiving antennas of the first wireless device at a time instance.

3. The method of example 1, wherein the estimating the second order statistics includes estimating covariance of a channel matrix using an averaging method in which the channel matrix is formulated as an average of autocovariance of an estimated channel response over all the receiving antennas of the first wireless device, at different time instances.

4. The method of example 1, wherein the performing the channel estimation includes: performing the channel estimation by interpolating channel estimates from the reference tones received on the second number of resource elements using an interpolation filter.

5. The method of example 1, further comprising: determining, using the second order statistics, an interpolation filter.

6. The method of example 5, wherein the determining the interpolation filter includes using a decimated version of a covariance matrix calculated during the training phase.

7. The method of example 6, wherein the determining the interpolation filter is performed by: determining an eigenvector factorization of the covariance matrix, wherein the eigenvector factorization is represented as: $R_{HH} \approx V \cdot D \cdot V^*$, wherein $R_{HH}$ is the covariance matrix, V is an eigenvectors matrix and D is a diagonal matrix of eigenvalues, and * is a conjugate transpose operation; and estimating the interpolation filter as function of the eigenvectors matrix and a decimated version of the eigenvectors matrix.

8. The method of example 7, wherein the function is represented as $C = V \cdot (V_M)^{-1}$, where C represents the interpolation filter, V M is the decimated version of V.

9. The method of example 5, further including: estimating an error covariance matrix representative of an error in the estimated channel response over all of the receiving antennas computed by interpolating channel estimates; and selectively revising, for future use, the second number of resource elements of reference tones using a measure of the error covariance matrix.

10. The method of example 9, wherein the measure of the error covariance matrix includes a comparison between a sum of squares of diagonal entries of the error covariance matrix and a threshold.

11. A method of wireless communication, comprising: transmitting, to multiple receive antennas of a first wireless device from a transmit antenna of a second wireless device, during a training phase, reference tones using a first number of resource elements of a wireless channel between the transmit antenna and the multiple receive antennas; receiving, at an end of the training phase, an instruction to transmit reference tones using a second number of resource elements; and transmitting, during an operational phase after the training phase, reference tones to the multiple receive antennas of the first wireless device using the second number of resource elements, wherein the second number is different from the first number and wherein the second number is based on an estimated second order statistics of the wireless channel.

12. The method of example 11, further including: receiving, during the operational phase, another instruction to transmit reference tones using a third number of resource elements, wherein the third number is different from the first number and the second number; and transmitting, after receiving the another instruction, reference tones to the first wireless device using the third number of resource elements.

13. The method of any of examples 1 to 12, wherein the resource elements comprise subcarriers.

14. The method of any of examples 1 to 12, wherein the resource elements comprise time slots.

15. The method of any of examples 1 to 14, wherein the second number of resource elements is equal to 1.

16. A wireless communication method, implementable by a wireless communication apparatus, comprising: estimating, during a training phase, a second order statistics for a first wireless channel and a second wireless channel between a transmitter and a receiver comprising multiple antennas, wherein the second order statistics is estimated using reference tones transmitted on a first number of resource elements; predicting, during an operational phase subsequent to the training phase, an estimate of the second wireless channel based on the second order statistics and an estimate of the first wireless channel calculated using reference tones transmitted on a second number of resource elements, where the second number is less than the first number; and communicating, during the operational phase, over the second wireless channel using the estimate of the second wireless channel resulting from the predicting; wherein the first wireless channel and the second wireless channel include non-overlapping frequencies.

17. The method of example 16, wherein the second order statistics comprises a cross-covariance between an estimate of the first wireless channel and an estimate of the second wireless channel.

18. The method of example 17, wherein the estimate of the first wireless channel and the estimate of the second wireless channel are obtained at different times.

19. The method of example 16 or 17, wherein the method is implemented by a base station in a frequency division duplexing (FDD) network.

20. The method of example 16 or 17, wherein the method is implemented by a base station in a time division duplexing (TDD) network.

21. The method of any of examples 1 to 20, wherein the reference tones during the training phase are transmitted over a non-contiguous spectrum.

22. A method of wireless communication, comprising: receiving, by a first communication device, a number of subcarriers from a second communication device, each including a corresponding reference signal; calculating an inversion factor for each subcarrier based on a received value of the corresponding reference signal; and transmitting by the first communication device to the second communication device, at least some of the subcarriers by scaling a pilot signal using a corresponding inversion factor.

23. The method of example 22, wherein the subcarriers are received in a single time slot.

24. The method of example 22, wherein the subcarriers are received over multiple time slots.

25. The method of any of examples 22 to 24, wherein the calculating the inversion factor includes using a regularized zero forcing technique, thereby avoiding singularities in calculations.

26. The method of example 22, wherein the inversion factor is a complex number.

27. The method of any of examples 22 to 26, wherein the scaling the pilot signal includes multiplying the pilot signal by the inversion factor.

28. The method of example 22, wherein the first communication device is a user terminal in a wireless network and the second communication device is a network device in the wireless network.

29. The method of example 25, wherein the calculating the inversion factor includes evaluating:

$$\tilde{H}_{AB}^{-1} = \frac{H_{AB}^*}{H_{AB}^* \cdot H_{AB} + N_0},$$

wherein $\tilde{H}_{AB}^{-1}$ represents the inversion factor, $H^*_{AB}$ represents complex conjugate of the received value, and No represents noise variance in received reference signals.

30. The method of example 29, wherein the calculating is repeated and averaged over multiple received reference signal transmissions for each subcarrier.

31. The method of any of examples 22 to 29, wherein the reference signal and the pilot signal are inverse functions of each other.

32. A method of wireless communication, comprising: transmitting, to a first communication device, from a second communication device, a number of subcarriers, each subcarrier including a corresponding reference signal; receiving, from the first communication device, at least some of the subcarriers carrying pilot signals scaled by inversions factors for the subcarriers; and estimating a communication channel between the second communication device to the first communication device using the inversion factors.

33. The method of example 32, wherein the estimating the communication channel includes interpolating inversion factors at intermediate subcarriers for which no inversion factors were received from the first communication device.

34. The method of example 32, wherein the corresponding reference signals transmitted on each subcarriers are identical.

35. The method of example 32, further including: performing a subsequent transmission from the second communication device to the first communication device by pre-coding using a result of the estimating the communication channel.

36. The method of example 35, wherein the pre-coding includes Tomlinson-Harashima precoding.

37. The method of example 32, wherein the subcarriers on which reference signals are transmitted include every Mth subcarrier of the communication channel, where M is an integer greater than 1.

38. The method of example 32, wherein the estimating the communication channel further includes estimating contributions of reflectors to the communication channel using second order statistics.

39. The method of example 32, wherein the inversion factors are complex scalar numbers.

40. A wireless communication apparatus comprising: a processor; a non-transitory memory; and a wireless transceiver, wherein a method recited in one or more of examples 1 to 39 is stored in the non-transitory memory, and wherein the processor is configured to perform the method using the wireless transceiver for transmitting or receiving signals.

41. The wireless communication apparatus of example 22, wherein the wireless communication apparatus is a base station of a multi-user multi-input multi-output (MU-MIMO) wireless system.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, implementable by a wireless communication apparatus, comprising:
   estimating, during a training phase, a second order statistics for a first wireless channel and a second wireless channel between a transmitter and a receiver comprising multiple antennas, wherein the second order statistics is estimated using reference tones transmitted on a first number of resource elements;
   predicting, during an operational phase subsequent to the training phase, an estimate of the second wireless channel based on the second order statistics and an estimate of the first wireless channel calculated using reference tones transmitted on a second number of resource elements, where the second number is less than the first number; and
   communicating, during the operational phase, over the second wireless channel using the estimate of the second wireless channel resulting from the predicting;
   wherein the first wireless channel and the second wireless channel include non-overlapping frequencies.

2. The method of claim 1, wherein the second order statistics comprises a cross-covariance between an estimate of the first wireless channel and an estimate of the second wireless channel.

3. The method of claim 2, wherein the estimate of the first wireless channel and the estimate of the second wireless channel are obtained at different times.

4. The method of claim 1, wherein the predicting the estimate of the second wireless channel comprises:
   computing an average of the second order statistics,
   wherein the estimate of the second wireless channel is based on an inverse of the average of the second order statistics.

5. The method of claim 4, wherein the inverse of the average of the second order statistics is approximated using principal component analysis (PCA).

6. The method of claim 1, wherein the method is implemented by a base station in a frequency division duplexing (FDD) network.

7. The method of claim 1, wherein the reference tones during the training phase are transmitted over a non-contiguous spectrum.

8. The method of claim 1, wherein one of the first wireless channel and the second wireless channel corresponds to a first path from the transmitter to the receiver, and the other one of the first wireless channel and the second wireless channel corresponds to a second path from the receiver to the transmitter.

9. A wireless communication apparatus, comprising:
   a processor; and
   a transceiver,
   wherein the processor is configured to:
      estimate, during a training phase, a second order statistics for a first wireless channel and a second wireless channel between a transmitter and a receiver comprising multiple antennas, wherein the second order statistics is estimated using reference tones transmitted on a first number of resource elements, and
      predict, during an operational phase subsequent to the training phase, an estimate of the second wireless channel based on the second order statistics and an estimate of the first wireless channel calculated using reference tones transmitted on a second number of resource elements, where the second number is less than the first number,
   wherein the transceiver is configured to:
      communicate, during the operational phase, over the second wireless channel using the estimate of the second wireless channel resulting from the predicting, and
   wherein the first wireless channel and the second wireless channel include non-overlapping frequencies.

10. The wireless communication apparatus of claim 9, wherein the second order statistics comprises a cross-covariance between an estimate of the first wireless channel and an estimate of the second wireless channel.

11. The wireless communication apparatus of claim 10, wherein the estimate of the first wireless channel and the estimate of the second wireless channel are obtained at different times.

12. The wireless communication apparatus of claim 9, wherein the processor is configured, as part of predicting the estimate of the second wireless channel, to:
   compute an average of the second order statistics,
   wherein the estimate of the second wireless channel is based on an inverse of the average of the second order statistics.

13. The wireless communication apparatus of claim 12, wherein the inverse of the average of the second order statistics is approximated using principal component analysis (PCA).

14. The wireless communication apparatus of claim 9, wherein the wireless communication apparatus comprises a base station configured to operate in a frequency division duplexing (FDD) network.

15. The wireless communication apparatus of claim 9, wherein the wireless communication apparatus is a base station of a multi-user multi-input multi-output (MU-MIMO) wireless system.

16. A non-transitory computer-readable storage medium having instructions stored thereupon for wireless communication, the instructions when executed by a data processing apparatus, cause the data processing apparatus to perform operations comprising:
- estimating, during a training phase, a second order statistics for a first wireless channel and a second wireless channel between a transmitter and a receiver comprising multiple antennas, wherein the second order statistics is estimated using reference tones transmitted on a first number of resource elements;
- predicting, during an operational phase subsequent to the training phase, an estimate of the second wireless channel based on the second order statistics and an estimate of the first wireless channel calculated using reference tones transmitted on a second number of resource elements, where the second number is less than the first number; and
- communicating, during the operational phase, over the second wireless channel using the estimate of the second wireless channel resulting from the predicting;

wherein the first wireless channel and the second wireless channel include non-overlapping frequencies.

17. The non-transitory computer-readable storage medium of claim 16, wherein the second order statistics comprises a cross-covariance between an estimate of the first wireless channel and an estimate of the second wireless channel.

18. The non-transitory computer-readable storage medium of claim 17, wherein the estimate of the first wireless channel and the estimate of the second wireless channel are obtained at different times.

19. The non-transitory computer-readable storage medium of claim 16, wherein the data processing apparatus is implemented by a base station in a frequency division duplexing (FDD) network.

20. The non-transitory computer-readable storage medium of claim 16, wherein the reference tones during the training phase are transmitted over a non-contiguous spectrum.

* * * * *